(12) United States Patent
Eswaravaka et al.

(10) Patent No.: US 12,207,138 B2
(45) Date of Patent: Jan. 21, 2025

(54) SYSTEM AND METHOD FOR ADAPTIVELY TRACKING AND ALLOCATING CAPACITY IN A BROADLY-DISPERSED WIRELESS NETWORK

(71) Applicant: John Mezzalingua Associates, LLC, Liverpool, NY (US)

(72) Inventors: Sasi Eswaravaka, Liverpool, NY (US); Vishal Agrawal, Liverpool, NY (US); John Blasko, Liverpool, NY (US); Gilberto Brizzi, Liverpool, NY (US); Todd E. Landry, Liverpool, NY (US); Patrick William Henkle, Liverpool, NY (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 0 days.

(21) Appl. No.: 18/094,045

(22) Filed: Jan. 6, 2023

(65) Prior Publication Data

US 2023/0224762 A1    Jul. 13, 2023

Related U.S. Application Data

(63) Continuation of application No. 16/810,474, filed on Mar. 5, 2020, now Pat. No. 11,558,782, which is a
(Continued)

(51) Int. Cl.
*H04W 28/20* (2009.01)
*H04W 24/02* (2009.01)
(Continued)

(52) U.S. Cl.
CPC .......... *H04W 28/20* (2013.01); *H04W 24/02* (2013.01); *H04W 48/06* (2013.01); *H04W 76/10* (2018.02); *H04W 76/27* (2018.02)

(58) Field of Classification Search
CPC ..... H04W 28/20; H04W 24/02; H04W 48/06; H04W 76/10; H04W 76/27; H04W 88/085; H04W 28/16
See application file for complete search history.

(56) References Cited

U.S. PATENT DOCUMENTS 6,091,954 A * 7/2000 Haartsen ............... H04M 15/00
455/450
6,125,280 A * 9/2000 Grandhi ................ H04W 24/02
455/446
(Continued)

FOREIGN PATENT DOCUMENTS

JP      2012085155 A     4/2012
JP      2012248909 A    12/2012
(Continued)

OTHER PUBLICATIONS

XP32231963A: Namba et al., "Colony-RAN Architecture for Future Cellular Network," Future Network & Mobile Summit (Futurenetw) 2012, IEEE, (8 Pages).
(Continued)

*Primary Examiner* — Kan Yuen
(74) *Attorney, Agent, or Firm* — BRYAN CAVE LEIGHTON PAISNER LLP

(57) ABSTRACT

Disclosed is a system for tracking and dynamically allocating wireless capacity within a wireless telecommunications network. The system has a plurality of processor levels: a layer of baseband-level capacity processors that are deployed within each baseband processor; a layer of client-level capacity processors that are deployed within each wireless base station; a layer of server-level capacity processors, each of which orchestrate allocation of wireless capacity over a unique domain of wireless base stations; and a master level capacity processor. Wireless capacity is allocated in terms of active connections to wireless devices,
(Continued)

and the active connections are quantized and allocated as logical connections, or connection tokens. The system dynamically allocates wireless capacity so that resources are devoted to venues and environments where demand is greatest at any given time.

12 Claims, 9 Drawing Sheets

Related U.S. Application Data continuation of application No. 15/918,799, filed as application No. PCT/US2018/019468 on Feb. 23, 2018, now Pat. No. 10,616,806.

(60) Provisional application No. 62/462,633, filed on Feb. 23, 2017.

(51) Int. Cl.
*H04W 48/06* (2009.01)
*H04W 76/10* (2018.01)
*H04W 76/27* (2018.01)

(56) References Cited

U.S. PATENT DOCUMENTS

| | | | |
|---|---|---|---|
| 6,370,386 B1 | 4/2002 | Williams | |
| 6,484,145 B1* | 11/2002 | Horne | G06Q 10/06315 |
| | | | 455/450 |
| 6,631,121 B1 | 10/2003 | Yoon | H04L 47/12 |
| | | | 370/335 |
| 6,792,273 B1 | 9/2004 | Tellinger et al. | |
| 7,477,621 B1 | 1/2009 | Loc | H04W 28/20 |
| | | | 370/348 |
| 9,078,192 B2* | 7/2015 | Iyer | H04W 48/06 |
| 9,900,445 B2 | 2/2018 | Seuken et al. | |
| 10,271,339 B2 | 4/2019 | Takeuchi | |
| 10,616,806 B2 | 4/2020 | Eswarakava et al. | |
| 11,558,782 B2* | 1/2023 | Eswarakava | H04W 76/10 |
| 2002/0080816 A1 | 6/2002 | Spinar et al. | |
| 2002/0123314 A1* | 9/2002 | Kitazawa | H04L 47/822 |
| | | | 455/135 |
| 2004/0042398 A1 | 3/2004 | Peleg | H04L 47/745 |
| | | | 370/230 |
| 2005/0193113 A1* | 9/2005 | Kokusho | H04L 67/1008 |
| | | | 709/225 |
| 2005/0195741 A1 | 9/2005 | Doshi | H04L 47/825 |
| | | | 370/230 |
| 2007/0002743 A1 | 1/2007 | Fan | |
| 2007/0160047 A1 | 7/2007 | Park | G01S 5/04 |
| | | | 370/390 |
| 2007/0180112 A1 | 8/2007 | McEnroe | H04N 21/2393 |
| | | | 709/226 |
| 2011/0189946 A1 | 8/2011 | Fukuzawa | H04W 72/02 |
| | | | 455/7 |
| 2012/0260231 A1* | 10/2012 | Kawaba | G06F 11/3419 |
| | | | 717/106 |
| 2013/0258923 A1 | 10/2013 | Chou | H04W 52/0206 |
| | | | 370/311 |
| 2013/0279457 A1 | 10/2013 | Takano | H04B 17/318 |
| | | | 370/329 |
| 2014/0045497 A1 | 2/2014 | Abe et al. | |
| 2014/0328178 A1 | 11/2014 | Haberland et al. | |
| 2014/0379910 A1 | 12/2014 | Saxena | H04L 47/215 |
| | | | 709/225 |
| 2015/0131468 A1 | 5/2015 | Navarro | H04W 24/02 |
| | | | 370/252 |
| 2015/0373684 A1* | 12/2015 | Uchino | H04W 72/20 |
| | | | 370/330 |
| 2016/0227541 A1 | 8/2016 | Damnjanovic | H04L 5/0091 |
| 2016/0295564 A1 | 10/2016 | Landry et al. | |
| 2016/0374122 A1 | 12/2016 | Lim et al. | |
| 2017/0177901 A1* | 6/2017 | Lancaster | G06F 21/6245 |
| 2017/0245140 A1 | 8/2017 | Au | H04W 84/00 |
| 2017/0308866 A1 | 10/2017 | Dotan-Cohen | H04L 43/0876 |
| 2018/0027130 A1 | 1/2018 | Yermakov | H04M 15/8044 |
| | | | 455/405 |
| 2020/0059627 A1* | 2/2020 | Sano | H04N 21/4424 |

FOREIGN PATENT DOCUMENTS

| | | |
|---|---|---|
| JP | 2016162067 A | 9/2016 |
| JP | 2016187112 A | 10/2016 |
| JP | 2016540441 A | 12/2016 |
| KR | 2001-0101286 A | 11/2001 |
| KR | 2014-0099484 A | 8/2014 |
| WO | 2015045444 A1 | 4/2015 |
| WO | 2015085273 A1 | 6/2015 |
| WO | 2016031101 A1 | 3/2016 |
| WO | 2016041595 A1 | 3/2016 |
| WO | 2016054183 A1 | 4/2016 |
| WO | 2018156926 A1 | 8/2018 |

OTHER PUBLICATIONS

Abhishek Nayak, et al., "Effective ARP Based Call Admission Control (CAC) Scheme for LTE Systems," ICWMC 2013, The Ninth International Conference on Wireless and Mobile Communications, pp. 119-122.

* cited by examiner

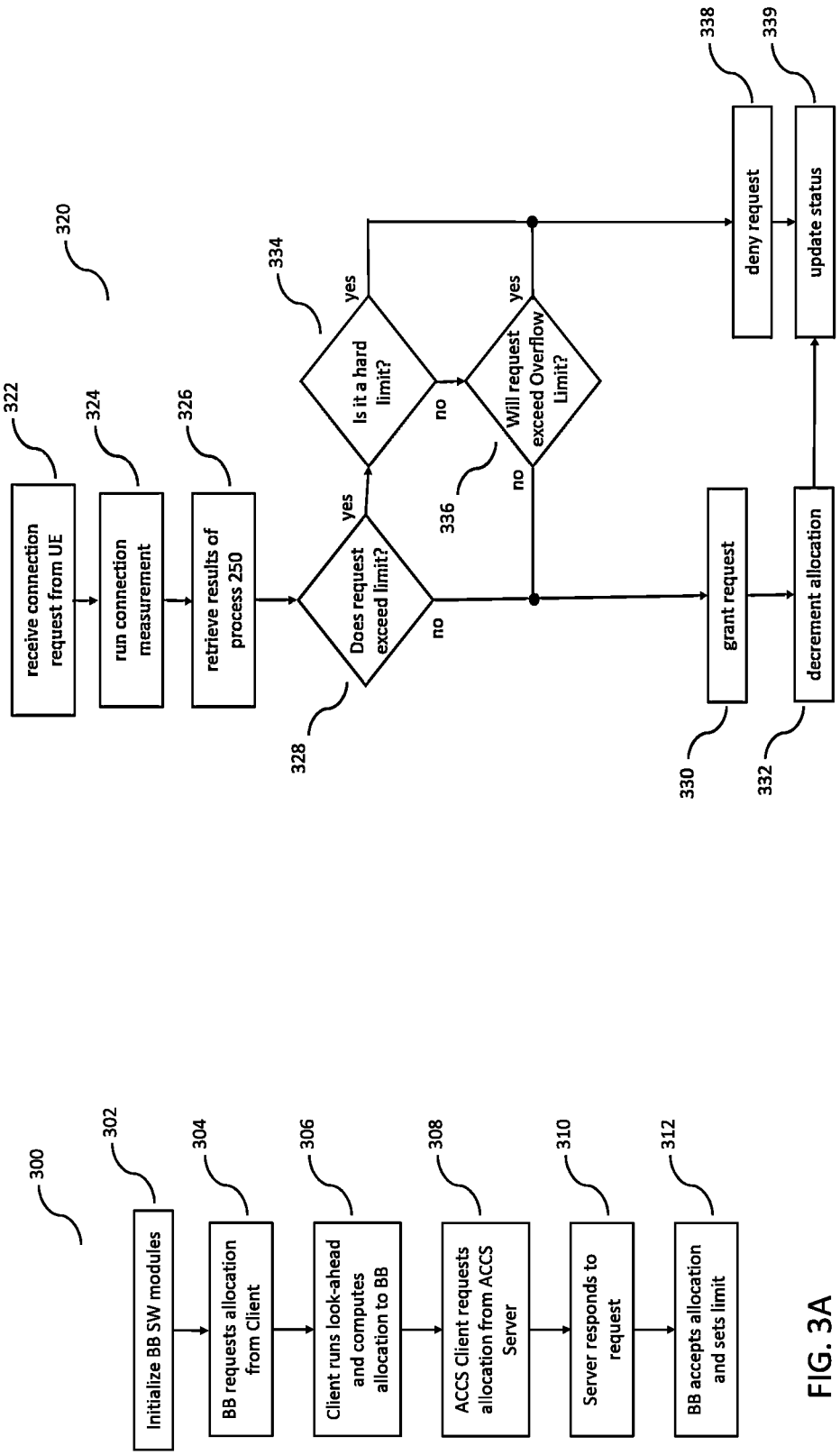

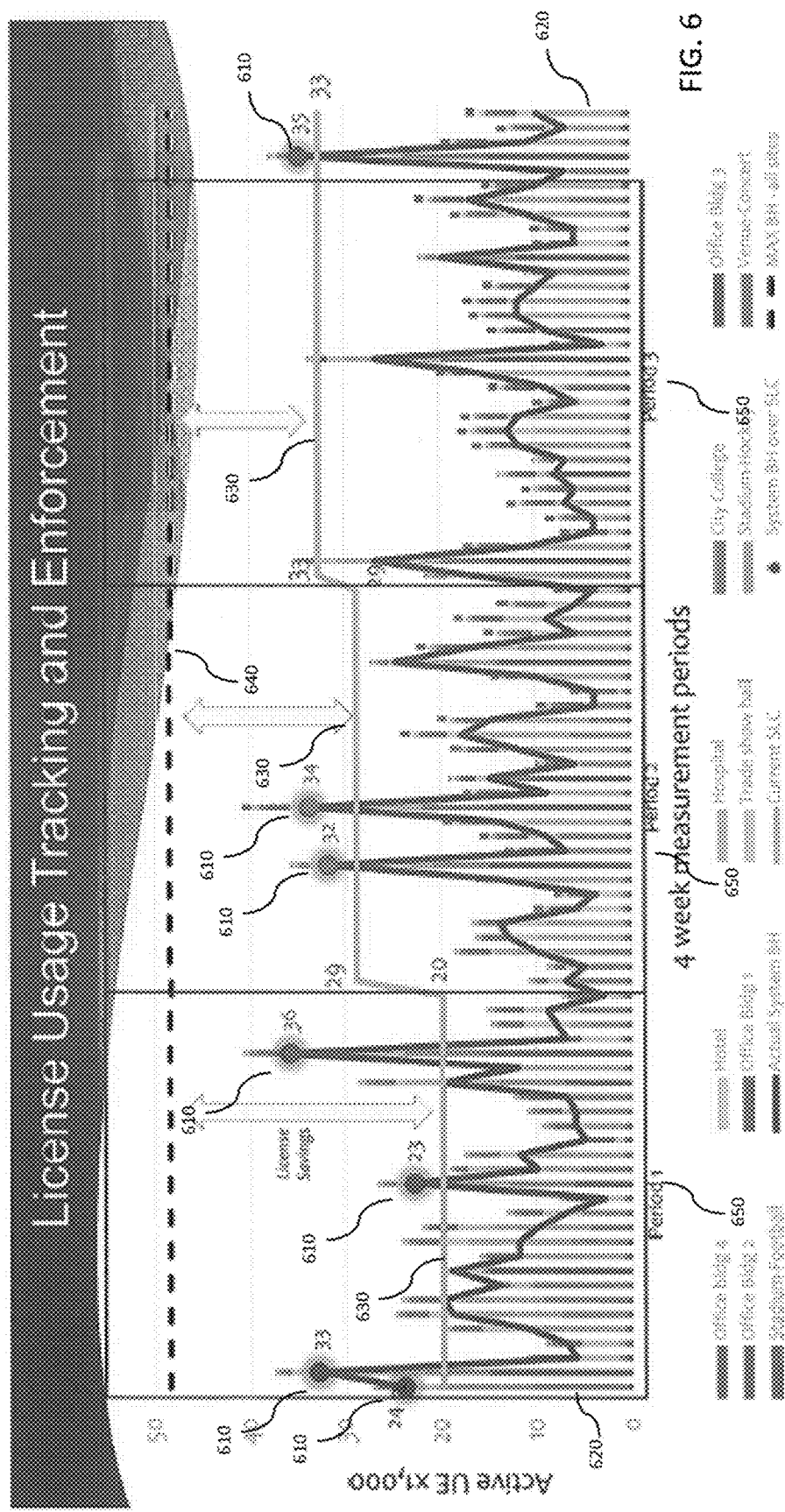

SYSTEM AND METHOD FOR ADAPTIVELY TRACKING AND ALLOCATING CAPACITY IN A BROADLY-DISPERSED WIRELESS NETWORK

CROSS-REFERENCE TO RELATED APPLICATIONS

This application is a Continuation of U.S. patent application Ser. No. 16/810,474, filed on Mar. 5, 2020, which is a Continuation Application of U.S. patent application Ser. No. 15/918,799, filed on Mar. 12, 2018, which is a National Stage Entry of International Application No. PCT/US18/19468, filed on Feb. 23, 2018, which claims the benefit of U.S. Provisional Application No. 62/462,633, filed on Feb. 23, 2017, the contents of which are all hereby incorporated by reference herein in their entirety.

BACKGROUND OF THE INVENTION

Field of the Invention

The invention relates to wireless communications system infrastructure, and the efficient management of wireless communication devices to a wireless network that dynamically accounts for and adapts to changes in connection usage across broad geographic areas.

Related Art

Conventional wireless communications systems are made up of multiple base stations that generate wireless signals at prescribed frequencies and encoding schemes, over which wireless communication devices within reach of the wireless signals (i.e., within a wireless coverage area) can connect and communicate with a terrestrial communications network, enabling communications to other devices, systems, computers, networks and so forth. These conventional wireless communications systems are very inefficient in several ways. Notably, the base stations are individually engineered to accommodate a peak concurrent number of wireless communication devices and their corresponding connections. A wireless coverage area often includes multiple base stations generating signals at the same, and at different, frequency bands, to accommodate such peak concurrent usage. However, while serving the same wireless coverage areas, each base station is individually engineered to meet a fixed peak capacity level. Furthermore, peak concurrent usage often occurs for only a brief period on any given day or week. In addition, usage patterns often vary widely from one wireless coverage area to another. For example, peak concurrent usage within an office building in a commercial business district might occur at 2:00 pm, while peak concurrent usage within an apartment building in a residential community might occur at 8:00 pm. In each case, the wireless base stations serving each of those locations are engineered to serve peak usage capacity, even though the system operates substantially below the peak levels for the vast majority of the time. The result is a network of base stations that are individually over-engineered at fixed peak capacity levels resulting in significantly higher than necessary costs for each individual base station as well as for the entire wireless communication system as a whole.

There are certain small cell baseband solutions that are said to optimize base station connections within a given local wireless coverage area such as single building. However, none of these solutions can balance concurrent connections across many base stations serving multiple disparate and geographically dispersed wireless coverage areas or locations.

There are other solutions that are configured such that the baseband processor portion of the solution is separated physically from the radio portion of the solution by a network referred to as a fronthaul. In these cases, the baseband processor is a physical embedded hardware device with physical interface connections to multiple radios (typically 6 physical connections). In some cases radios can be "daisy chained" to support multiples of 6 (for example: 12(6×2), 18(6×3), 24(6×24)) radios per baseband processor device. In this case, a single physical baseband processor device can connect over a dedicated physical fronthaul connection (typically a fiber optic medium) to the radios that are physically located elsewhere. Each embedded baseband processor can support multiple concurrent device connections (e.g., 2000 device connections) whereby the actual connections may be spread across the various physical sites where the radios are located. Furthermore, some solutions allow for more than one baseband processor device (typically 2) to be pooled within a common on equipment chassis or sub rack. Due to very rigid and short latency requirements mandated by relevant standard specifications, the geographic distance that can be accommodated by such fronthaul solutions is limited to a few kilometers.

Deficiencies of these solutions include the following. First, these known solutions are limited to sharing capacity between a fixed and finite number of physical embedded baseband processors that are collocated at the same physical site. Second, shared capacity is limited to a few thousand device connections.

Other known technologies include Call Admission Control (CAC) systems, which are designed to prevent oversubscription of Voice Over IP (VoIP) networks, or other "real time" communications solutions where oversubscription can degrade overall performance for users of the system. Such real-time media traffic is very sensitive to network latency and congestion, as opposed to data traffic, such as a connection to an email server, which is very tolerant over latency. These CAC solutions are used in the set-up phase of a call or connection and as such can be considered as a preventive congestion control procedure such that a connection will be prevented if and when it is expected to result in a congestion condition. Typically, CAC procedures can be completed within a relatively long response cycle, which may be as high as 100 milliseconds or even greater.

Deficiencies of CAC solutions include the following. As noted above, CAC solutions evaluate connection requests at the time of access and either allow or disallow access based on service conditions at that point in time. These admission requests can take a relatively long time to complete, for instance more than 100 milliseconds, depending on various network conditions. For example, the call admission control "service" may not be physically collocated with the network access components, but is reachable across a shared network such as an IP network. An asynchronous solution such as Voice over IP can easily tolerate such long duration requests. However, this approach is not feasible for wireless mobile communications where connection operations have strict timing constraints measured in low milliseconds and microseconds.

Accordingly, what is needed is a system for a wireless network that can efficiently accommodate for temporal and geographic fluctuations in peak concurrent demand for wireless device connections, served by a network of base stations that may be dispersed across a wide geography. The system must conform to the very demanding latency constraints of advanced wireless communications standards, while more accurately measuring and accounting for actual system wide concurrent connections of the wireless communication system to wireless communication devices. What is further needed is a system that balances and rebalances concurrent connection capacity, ensuring the most optimal and efficient use of the wireless communication system.

SUMMARY OF THE INVENTION

An aspect of the present invention involves a system for allocating capacity in a wireless communication network. The system comprises a plurality of baseband-level capacity processors, each coupled to a corresponding baseband processor, wherein each of the plurality of baseband-level capacity processors determines a number of actively connected wireless devices and a number of inactively connected wireless devices, maintains a baseband-level active connection allocation, and responds to a request for an active connection from at least one requesting wireless device. The system further comprises a plurality of client-level capacity processors, each corresponding to a wireless base station, and each coupled to a distinct subset of baseband-level capacity processors within the plurality of baseband capacity processors, wherein each of the plurality of client-level capacity processors maintains an active connection reservation, provides the baseband-level active connection allocation to each of its corresponding baseband-level capacity processors, performs a client-level look ahead function to determine a future demand for active connections, and responds to requests for a baseband-level additional active connection allocation from its corresponding baseband-level capacity processors.

In a further aspect of the present invention, the system further comprises a plurality of server-level capacity processors, each coupled to a distinct subset of client-level capacity processors within the plurality of client-level capacity processors wherein each server-level capacity processor maintains an active connection access pool, performs a server-level look ahead function, and responds to requests for a client-level additional active connection allocation from its corresponding client-level capacity processors; and a master-level capacity processor coupled to the plurality of server-level capacity processors, wherein the master level capacity processor maintains a master active connection access pool, performs a master-level look ahead function, and responds to requests for a server-level additional active connection allocation from each of the plurality of server-level capacity processors.

Another aspect of the present invention involves a method of dynamically allocating connection capacity in a wireless communication system. The method comprises determining, at a lower processing level, a number of actively-connected wireless devices and a number of inactively-connected wireless devices connected to a baseband processor; performing a look-ahead function to determine a future need for active connections; comparing the number of actively-connected wireless devices and the future need for active connections with an active connection allocation; if the step of comparing indicates insufficient number of active connections in the active connection allocation, sending a request for an additional active connection allocation from an upper processing layer; and if the step of comparing indicates a surplus of active connections in the active connection allocation, releasing the surplus of active connections to the upper processing layer.

BRIEF DESCRIPTION OF THE DRAWINGS

FIG. 3A illustrates an exemplary baseband initialization process executed by a baseband-level capacity processor according to the disclosure.

FIG. 3B illustrates an exemplary process for responding to a connection request, as executed by a connection control module according to the disclosure.

FIG. 6 illustrates a hypothetical timeline of the operation of process of FIG. 5.

DESCRIPTION OF EXEMPLARY EMBODIMENTS

Overview

Figure 1:
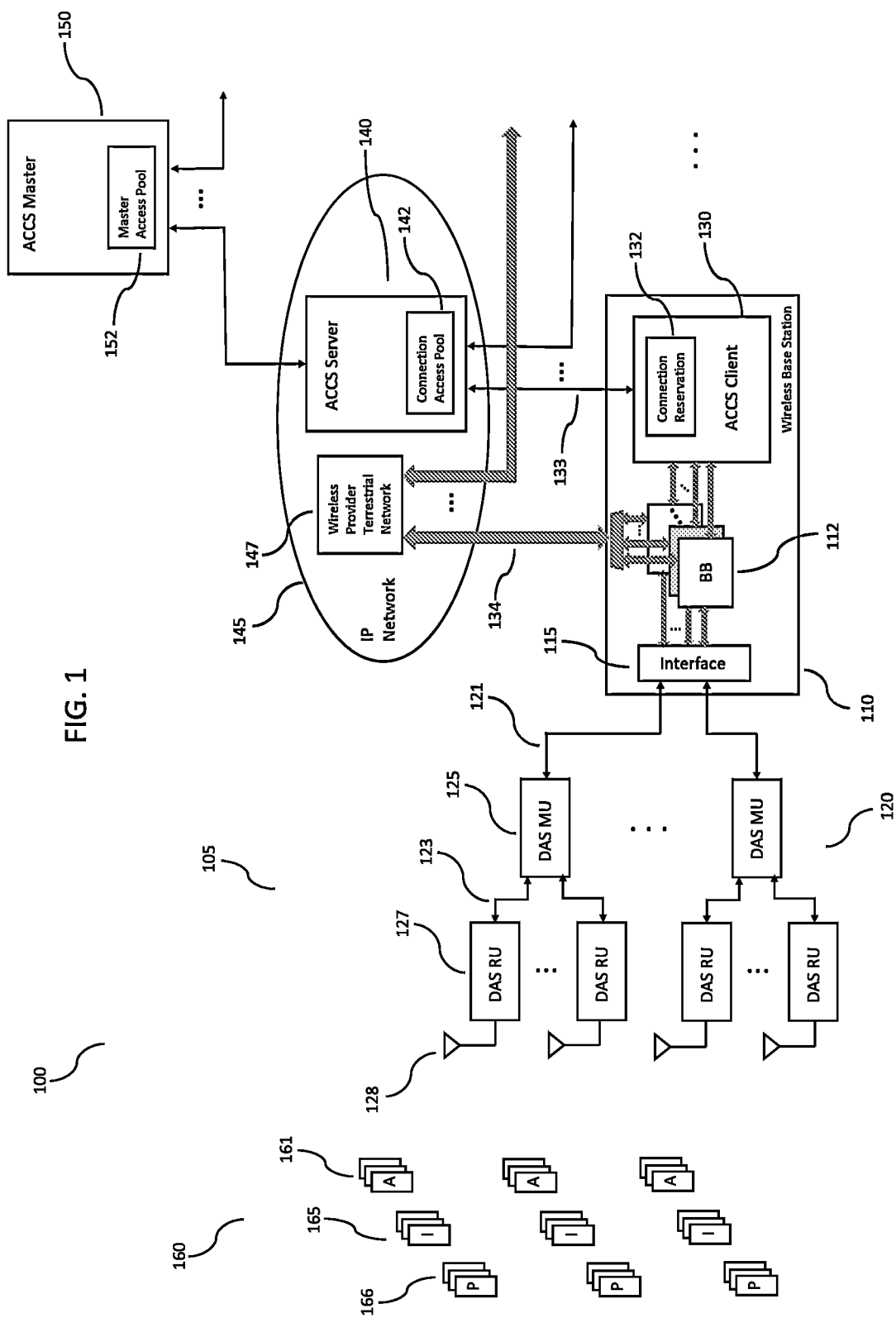
FIG. 1 illustrates an exemplary wireless communication system according to the disclosure.

Disclosed is an Adaptive Connection Control System (ACCS) that may be integrated into a wireless communications system infrastructure. The ACCS has a hierarchy of at least four tiers of subsystems: a plurality of baseband-level capacity processors within a given wireless base station of a plurality of wireless base stations dispersed across a broad geographical area; a plurality of client-level capacity processors (also referred to as "ACCS Clients"), each of which may be integrated into a given wireless base stations whereby each client-level capacity processor sits above, and is coupled to, the baseband-level capacity processors within a given wireless base station; a plurality of server-level capacity processors (also referred to as "ACCS Servers"), each of which sits above, and is coupled to, a given plurality of client-level capacity processors; and a master-level capacity processor (also referred to as an "ACCS Master"), which sits above, and is coupled to, the server-level capacity processors and responds to the needs and coordinates the actions of the server-level capacity processors and client-level capacity processors. The server-level capacity processors and the master-level capacity processor may be deployed within a wireless network operator's terrestrial network or may be deployed in a cloud computing environment.

The disclosed ACCS creates a distinction between physical capacity of the wireless communications infrastructure and the logical capacity of the wireless communications system. In conventional systems these are one and the same, whereby for the wireless communications infrastructure all of the wireless base stations must be designed for peak capacity and thus over-engineered. The wireless network operator must pay for that extra capacity, whether it is being used or not. With the physical capacity severed from the logical capacity, the wireless network operator need only pay for the logical capacity that is being used. Further, the geographic distribution of the logical capacity may vary greatly and dynamically over time.

The ACCS identifies connections that are reflective of real world user activity or usage of the wireless network, which is important because the nature of wireless communications is wide ranging and volatile. For example, voice calls impose a very different network load from text message exchanges, which are different from emails with attachments. Video streaming is different than interactive two-way video, etc. Furthermore, devices continuously send and receiving "background" communications, unknown to the users, such as message count updates for new social media posts, or file backups to cloud storage sites. Consequently, it is typical that wireless devices are "connected" to the network even when there is no user-initiated or user-involved communications.

Also, with the advent of Internet of Things and machine-to-machine communications, connections are often short in terms of duration and small in terms of information conveyed. It is highly desirable to identify the types of devices and characterize their impact on network capacity.

The ACCS dynamically allocates wireless connection capacity throughout the wireless network by maintaining an access pool of a predetermined number of connection tokens. As used herein, a connection token is a logical representation of a single active connection between a wireless base station and a given wireless device. A connection token may represent a number of wireless resources required for a single active connection (e.g., number of DL-SCH/CCH or UL-SCH/CCH transport block bits, etc.) of one or more bearers (e.g., across one or more aggregated carriers) for a single UE. Accordingly, for example, a given baseband processor (via its corresponding baseband-level capacity processor) has a given wireless capacity that may be quantized in connection tokens and managed accordingly. The logical representation of a connection token may be implemented in memory as a single value that is counted (incremented and decremented) as the number of connection tokens changes, as wireless capacity increases and decreases. For example, an ACCS may have a certain allocation of connection tokens in its master access pool that it allocates (via each server-level capacity processor and client-level capacity processor) to its individual baseband-level capacity processors. As each new wireless device gets connected to each baseband processor, the number of connection tokens allocated to its corresponding baseband-level capacity processor gets decremented by one. Once the connection terminates, the connection is released back to the baseband processor's corresponding baseband-level capacity processor, and the number of connection tokens is re-incremented. This may be done regardless of the type of wireless device, such as smartphone, tablet, vehicle, or fixed or stationary IoT appliance (e.g., gas meter, water valve, parking meter, building security system, etc.). Further, the access pool may have a specific allocation of connection tokens for each different device category, such as 3GPP-defined Device Category (e.g., Cat 0-8, Cat M, etc.). Alternatively, a connection token may be implemented as a software object or data object that includes information about device category, etc. As used herein, an "allocation" may refer to an aggregate of connection tokens that are allocated to, or transmitted to and held by, a given baseband-level capacity processor, client-level capacity processor, or server-level capacity processor.

Under exemplary operation, each baseband-level capacity processor keeps track of the number of wireless devices to which its corresponding baseband processor is currently actively connected, the number of wireless devices that are connected but are otherwise inactive, and the number of connection tokens currently allocated to it.

Each component of the ACCS (baseband-level capacity processor, client-level capacity processor, server-level capacity processor, and master-level capacity processor) may perform a "look ahead" function to anticipate upcoming demand. In doing so, each component executes its own local look-ahead functionality appropriate in scope and time to its level of the system.

Further, in order to meet the stringent latency requirements of modern telecommunication standards, the responsiveness to requests for additional connections, and the time horizon of each look-ahead function, differs with each layer of the system. In other words, at the baseband processor level, responses to UE connection requests must be immediate and any additional allocation of connection tokens must be very agile. Conversely, transactions between the server-level capacity processor and master-level capacity processor levels may take place at a slower rate, for example, at 15 minute intervals. Accordingly, at the server-level capacity processor and master-level capacity processor levels, accuracy in prediction is very important, but latency is not a top consideration.

Given its current and/or anticipated demand for connections, each client-level capacity processor may place an allocation request with its corresponding server-level capacity processor for additional wireless capacity in the form of additional connection tokens. The server-level capacity processor may then respond to this request, and depending on logic implemented (including the status of its own allocation and its configured policy rules) within the server-level capacity processor, may allocate additional connection tokens from its active connection access pool. In doing so, the server-level capacity processor may take one of the following actions in response to a request for additional allocation: (1) grant the full allocation request, (2) grant a partial allocation request, or (3) reject the allocation request. In all cases, the server-level capacity processor will account for and report device connections to facilitate usage analysis. The client-level capacity processor then balances its allocation between its own active connection access pool and the baseband-level active connection allocations of its baseband-level capacity processors, and performs its own look-ahead function to anticipate future demand.

At designated intervals, and based on changing connection conditions, each client-level capacity processor may make requests for an additional active connection allocation from its server-level capacity processor. Similarly, over time, each client-level capacity processor may also release active connection tokens from its active connection reservation, thereby returning them to the active connection access pool of its corresponding server-level capacity processor. Through this process, the server-level capacity processor will account for the number of connection tokens granted to each of its client-level capacity processors, which it has allocated from its active connection access pool as well as any outstanding demand for connection tokens beyond the capacity of its connection access pool.

The master-level capacity processor orchestrates the allocation of connection tokens, based on its awareness of current and future demand throughout the wireless network (based on data reported upward from its client-level capacity processors and server-level capacity processors as well as its own internal look-ahead function) as well as policies configured into the master-level capacity processor. Further, the master-level capacity processor may instruct its client-level capacity processors (via its corresponding server-level capacity processors) to selectively terminate low-priority active connections to specific wireless devices.

The master-level capacity processor measures actual peak concurrent connections across many physical sites associated with the active connection access pools of its server-level capacity processors over time and identifies adjustments needed for each server-level capacity processor to accommodate the actual usage as it varies (up or down) over time. Each server-level capacity processor may perform similar analytics based on the reports it receives from its associated client-level capacity processors. Accordingly, the server-level capacity processors and client-level capacity processors may each have adaptive characteristics to optimize how connection tokens are requested and granted.

Further, through reporting mechanisms implemented by the client-level capacity processors and server-level capacity processors, whereby each reports upward its activity and events in which demand was in excess of its allocation, the master-level capacity processor maintains historical data regarding overages and shortages of connection tokens throughout the wireless network. Given this, the ACCS disclosed herein is a technical solution that enables a new business model for network operators, whereby a network operator only buys needed capacity from infrastructure providers or neutral hosts. As demand grows or diminishes, the network operator has the option of obtaining additional connection tokens. Further, the network infrastructure providers and neutral hosts can scale their deployed networks in response to demand, mitigating the problem of "stranded capacity" resulting from deploying over-engineered wireless base stations that are designed to meet peak demand that may only happen very rarely.

The ACCS supports flexible policy-defined access enforcement whereby different policies and actions can be programmatically applied when a new connection exceeds a given allocation. For example, a connection resulting in excess connections can be denied, or allowed and accounted for in order to facilitate post event actions such as billing for additional connections. Different enforcement actions can be assigned to different pools existing within one distributed wireless system.

DETAILED DESCRIPTION

FIG. 1 illustrates an exemplary Adaptive Connection Control System (ACCS) 100 integrated into a distributed wireless network. The wireless system includes a plurality of wireless base stations 110, each of which may be coupled to a plurality of Distributed Antenna Systems (DAS) 120, whereby each DAS 120 has a master unit 125 that communicates with wireless base station 110 via a fronthaul network 121. Each master unit 125 may be connected to a plurality of remote units 127 over a distribution network 123. Each of the remote units 127 may include a radio transceiver that is connected to at least one antenna 128 over one or more RF cables, through which it can communicate with in-range wireless devices 160. Among the in-range wireless devices 160 are a plurality of active wireless devices 161, a separate plurality of inactive wireless devices 165, and a plurality of present wireless devices 166.

Each wireless base station 110 has a plurality of baseband processors 112 that are coupled to the plurality of DAS master units 125 via interface 115. Interface 115 may employ Common Public Radio Interface (CPRI) or a packetized digital protocol such as Internet Protocol (IP) for communication of digital baseband signals for both uplink and downlink. In an exemplary embodiment, each wireless base station 110 is an LTE eNodeB, and each of the plurality of baseband processors 112 implements the four protocol stack layers (PHY, MAC, RLC, and PDCP) for an individual band. It would be understood that the baseband processors 112 may be implemented in dedicated embedded hardware, or they may be implemented in software as virtual baseband processors. Wireless base station 110 further includes a backhaul bus 134 for communicating with a wireless provider terrestrial network 147 within an IP network 145. In an exemplary LTE implementation, backhaul bus 134 is an S1 interface.

Elements of the wireless network from the antennas 128 through the wireless base station 110 may be collectively referred to as the Radio Access Network (RAN) 105.

Typical operation of RAN 105 is as follows.

Uplink: One or more antennas 128 receives an RF electromagnetic signal from a given active wireless device 161. The remote unit 127 receives the signal from antenna 128, along with the entire RF environment within range of the antenna. Remote unit 127 performs the following functions: first, it amplifies the entire received RF signal for further processing; then it modulates the RF signal onto an optical signal that it then transmits over fiberoptic distribution bus 123. DAS master unit 125 receives the RF modulated optical signal being transmitted over fiberoptic distribution bus 123 line, demodulates the optical signal to extract and isolate the different RF component signal bands; applies digital attenuation to each of the RF component signal bands; separately amplifies each of the RF component signal bands; performs RF downconversion on each of the RF component signal bands to convert them into analog baseband signals; digitizes each of the analog baseband signals, and then either packetizes the digitized baseband signals for transmission over a packet-based protocol such the Internet Protocol (IP) or serializes the data for transmission according to a Common Pubic Radio Interface (CPRI) protocol. It will be understood that other types of transmission are possible and within the scope of the invention. The DAS master unit 125 then transmits the digitized baseband signals to wireless base station 110 over fronthaul network 121. Fronthaul network 121 may be implemented using Ethernet cabling, fiberoptic lines, or a wireless transmission medium.

Wireless base station 110 receives the uplink digital baseband signals and routes the band-specific data to its corresponding baseband processor 112. As mentioned earlier, each baseband processor 112 processes the digitized baseband signals for each band by implementing the four LTE protocol stack layers (PHY, MAC, RLC, and PDCP) to produce user data and control data. Wireless base station 110 then transmits the resulting user and control data to the Evolved Packet Core (EPC) (not shown) in the wireless provider terrestrial network 147.

Downlink: This is similar to uplink in reverse, but with a few differences. First, LTE specifies distinctions in modulation and processing between uplink and downlink, which will be understood to one with knowledge of LTE implementations. Second, master unit 125 and remote unit 127 process the downlink signals differently. For example, master unit 125 combines each of the band specific RF signals (from each of the baseband processors) into a single RF signal that it transmits by means of optical fiber to the remote units 127. Further, remote unit 127 converts the optical signal into RF and amplifies the merged RF signals to power each antenna 128 connected to it. It would be readily understood that these differences do not alter the nature of the disclosed invention and need not be elaborated further.

Through these processes, RAN 105 may be connected to thousands of mobile devices. These connections may take one of three forms: active wireless devices 161 are in the LTE RRC Connected State and are sending and/or receiving user plane information; inactive wireless devices 165 are in the LTE RRC Connected State but are not currently sending or receiving user plane information; and present wireless devices 166 are in the LTE RRC Idle State, are located within the coverage area, but are not currently connected to wireless base station 110.

Although exemplary wireless system is described with a DAS-based RAN, it will be readily understood that ACCS 100 may be integrated into any of a variety of wireless systems, including variations in which one or more wireless base stations 110 are directly coupled to one or more cellular macro antennas via conventional radio remote units, and may include a combination of DAS subsystems, macro cell base stations, and small cell base stations, and/or any additional wireless communications technologies.

Returning to FIG. 1, ACCS 100 includes components that are integrated into a wireless system at various levels: a baseband-level capacity processor coupled to each baseband processor 112; a client-level capacity processor 130 coupled to each baseband-level capacity processor within a given wireless base station 110; a plurality of server-level capacity processors 140, each of which is coupled to a distinct plurality of client-level capacity processors 130; and a master-level capacity processor 150 coupled to each of the plurality of server-level capacity processors 140.

Each wireless base station 110 includes a client-level capacity processor (ACCS Client) 130. Client-level capacity processor 130, as mentioned earlier, interacts with the baseband-level capacity processor within each baseband processors 112 to track wireless capacity usage and interact with server-level capacity processor 140. Functions of the client-level capacity processor 130 is described in further detail below. As illustrated, each client-level capacity processor 130 is connected to server-level capacity processor 140 over connection 133.

Elements of wireless system 100 are described in more detail below.

Baseband-Level Capacity Processor

Figure 2A:
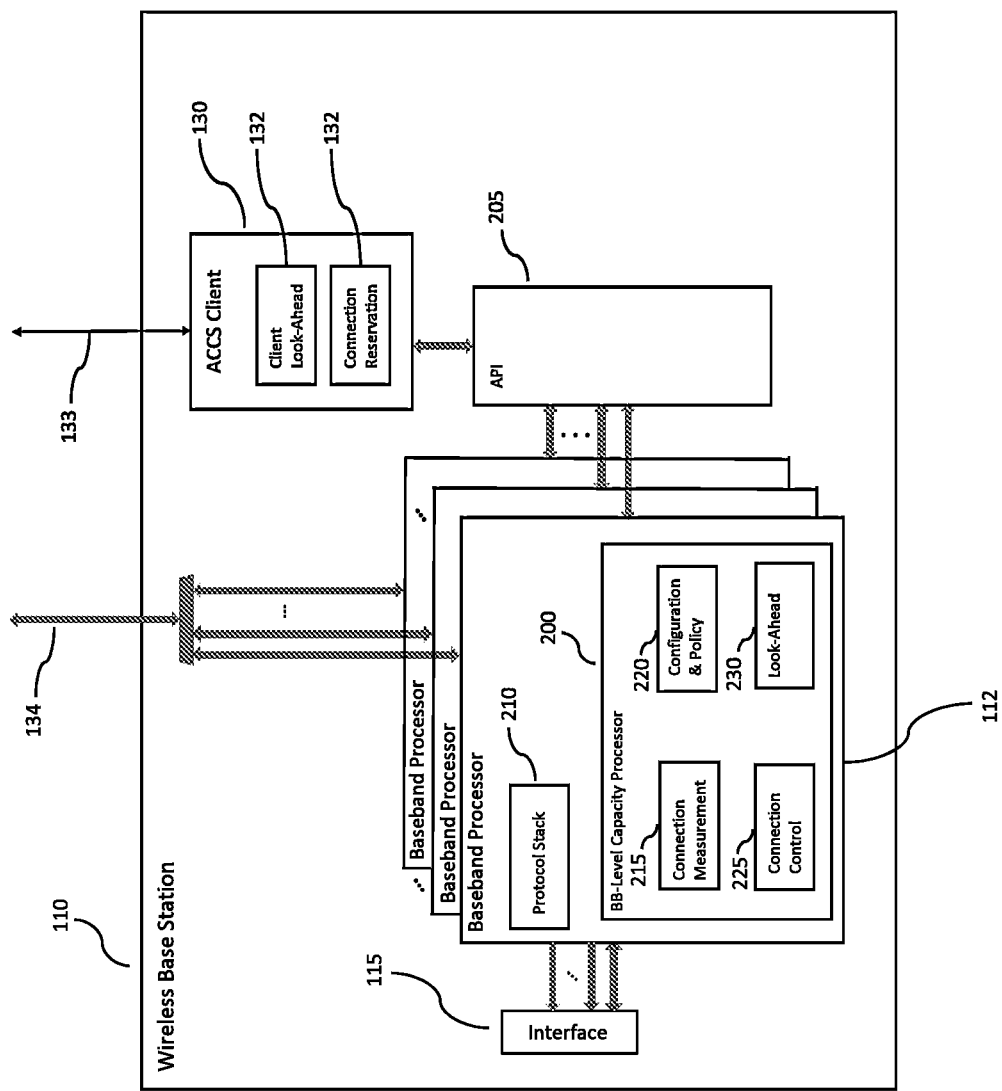
FIG. 2A illustrates an exemplary wireless base station according to the disclosure.

FIG. 2A illustrates further detail within wireless base station 110. As illustrated, each baseband processor 112 has a protocol stack implementation 210, which may be a software instantiation that implements the four protocol stack layers (PHY, MAC, RLC, and PDCP) for an individual band among the LTE bands used by wireless base station 110. In this case, the software for protocol stack 210 may be encoded as instructions in a machine-readable memory within wireless base station 110 and executed on hardware therein. Baseband processor 112 further comprises baseband-level capacity processor 200. Baseband-level capacity processor 200 has four software modules: connection measurement module 215; configuration and policy module 220; connection control module 225, and look-ahead module 230. Baseband-level capacity processor 200 communicates with client-level capacity processor 130 via API 205.

Connection measurement module 215 executes instructions to determine the number of active wireless devices 161 and inactive wireless devices 165 among in-range wireless devices 160. In-range wireless devices 160 may be in various communication states at any given time. For example, some of these devices may be idle or inactive, some may be actively transmitting information, the nature of the transmissions may be symmetrical or asymmetrical in terms of quantity of information or speed of transmission, etc. Connection measurement module 215 distinguishes between wireless communication devices that are "utilizing" capacity on the network, and those that are not, regardless of whether they are actively connected. To accomplish this, connection measurement module 215 identifies the communication state of each of the in-range wireless devices 160 served by wireless base station 110.

The following is an exemplary logic by which connection measurement module 215 obtains the Radio Resource Control (RRC) state and the Enhanced-Radio Access Bearer (E-RAB) state for each device bearer represented in each baseband processor 112. The RRC and E-RAB parameters are 3GPP KPIs and are identifiable and available to wireless base station 110 running a baseband processor 112. Using the E-RAB parameter, connection measurement module 215 executes instructions to obtain the Tx/Rx buffer states and/or timer states for each corresponding device bearer. Using this information, it identifies a given device bearer as active or inactive using the following logic.

An active E-RAB per 3GPP TS32.425 may be defined as follows:
- E-RABs with bursty flow are considered active when there is queued user data in the DL or UL
  - As used herein, "bursty flow" means E-RABs with a non-GBR (guaranteed bit rate) QCI
- E-RABs with continuous flow are always seen as active
  - As used herein, "continuous flow" means E-RABs with a GBR QCI

| E-RAB States | RRC State = Connected | RRC State = Idle |
|---|---|---|
| in-range wireless device 160 has at least 1 E-RAB with a Guaranteed Bit Rate QCI | connection measurement module 215 classifies the device as an active wireless device 161 | Not possible |

| E-RAB States | | RRC State = Connected | RRC State = Idle |
|---|---|---|---|
| in-range wireless device 160 has at least 1 E-RAB with a non-Guaranteed Bit Rate QCI, | AND wireless base station 110 has downlink data buffered for the wireless device in the PDCP, RLC or MAC sublayers; OR A non-zero buffer status report has been received from the in-range wireless device 160 for any logical channel group containing the logical channel for an E-RAB with non-GBR QCI; OR The RLC reordering timer t-Reordering (cf. 3GPP TS 36.322) is running for any E-RAB with non-GBR QCI; OR Control Plane CIoT EPS optimizations are being used AND wireless base station 110 has data pending in any of its Signalling Radio Bearer (SRB). | connection measurement module 215 classifies the device as an active wireless device 161 | |
| | AND none of the above apply | connection measurement module 215 classifies the device as an inactive wireless device 165 | |
| in-range wireless device 160 has no established E-RAB | AND Control Plane CIoT EPS optimizations are being used AND wireless base station 110 has data pending in any of its Signalling Radio Bearer (SRB). | connection measurement module 215 classifies the device as an active wireless device 161 | baseband processor 130 is unaware of the device |
| | AND none of the above apply | connection measurement module 215 classifies the device as an inactive wireless device 165 | |

Connection measurement module 215 may have a range of memory allocated to it with which it populates a table of data corresponding to the states of each of the active wireless devices 161 and inactive wireless devices 165, along with additional information corresponding to each active and inactive device pertaining to its type of connection.

Figure 2B:
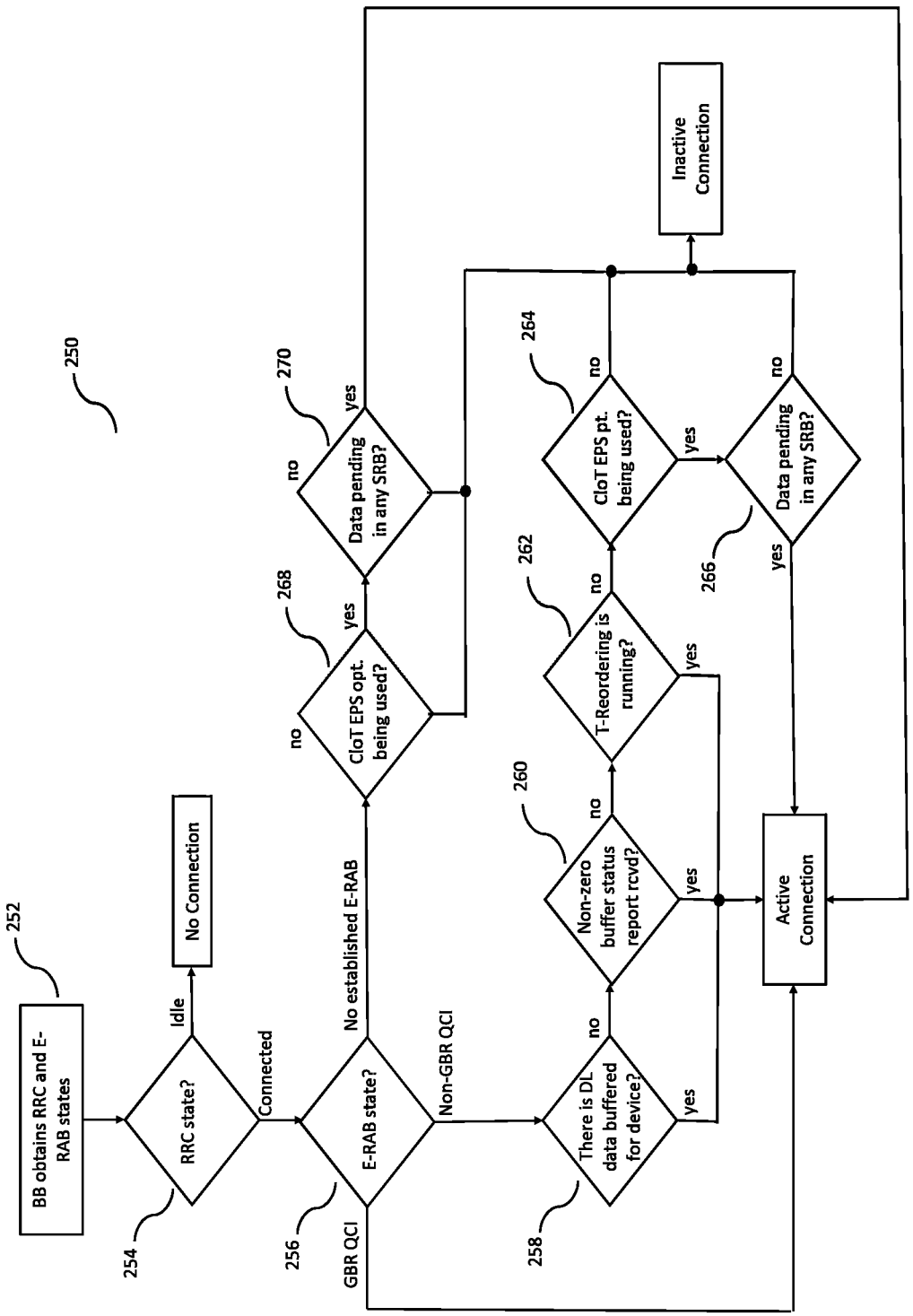
FIG. 2B illustrates an exemplary process executed by a connection measurement module according to the disclosure.

FIG. 2B illustrates an exemplary process 250 executed by connection measurement module 215 in implementing the above logic table according to the disclosure. In step 252, connection measurement module 215 executes instructions to extract the RRC and E-RAB states for each in-range wireless device 160. With this information, connection measurement module 215 executes the remaining steps of process 250 for each in-range wireless device 160.

In steps 252 and 254, connection measurement module 215 examines the RRC state of the wireless device in question. If the RRC state is Idle, then there is no connection to that wireless device. If the state is Connected, then process 250 proceeds to step 256, in which connection measurement module 215 examines the state of the E-RAB parameter of the wireless device. If the state indicates a Guaranteed Bit Rate QoS Class Identifier (GBR QCI), then connection measurement module 215 classifies this device as having an Active Connection (i.e., an active wireless device 161). If, however, the E-RAB state indicates a non-Guaranteed Bit Rate QCI, then the device might be an Active Connection, but additional information is needed. In this case, process 250 proceeds to step 258.

In step 258, connection measurement module 215 executes instructions to determine if there is downlink data buffered for this device in the PDCP, RLC, or MAC sublayers of protocol stack 210. If so, then the device is identified as an active wireless device 161. If not, process 250 proceeds to step 260, in which connection measurement module 215 determines if protocol stack 210 has received a non-zero buffer status from the given wireless device for any logical channel for an E-RAB with non-GBR QCI. If so, then the device is identified as an active wireless device 161. If no, process 250 proceeds to step 262, in which connection measurement module 215 determines whether the RLC reordering timer (t-Reordering, cf. 3GPP TS 36.322) is running for the given wireless device. If so, then the device is identified as an active wireless device 161. If not, then process 250 proceeds to step 264.

In step 264, connection measurement module 215 executes instructions to determine if Control Plane CIoT EPS (Cellular Internet of Things Evolved Packet System) optimizations are being used in connection with the given wireless device. This is to test if the given wireless device is an IoT UE that is transmitting data using the signaling radio bearer instead of the user data radio bearer. This mechanism may be used by IoT devices that transmit or receive infrequent and small data packets. However, this information alone is not sufficient, therefore process 250 includes a further step (step 266) of determining if the give wireless device also has any data pending in any of its Signaling Radio Bearers (ERB). If both of these conditions are true, then the given wireless device is an IoT device that is an active wireless device 161.

If none of the logic conditions of steps 258-266 are true, then the given wireless device is identified as having an Inactive Connection (i.e., an inactive wireless device 165). Even though the given wireless device is "connected" (RRC being in the connected state), it is not, at the time of measurement, consuming resources of the wireless radio network 100.

Returning to step 256, if the E-RAB state for the given in-range wireless device 160 is such that there is no established E-RAB, then process 250 proceeds to step 268, in which connection measurement module 215 executes similar instructions to those of step 264. However, the logical result is different in that, if the given wireless device has no established E-RAB, but CIoT EPS optimization is being used, and (in step 270) if there is data pending in any of the Signaling Radio Bearers (ERB), then the device is an IoT active wireless device 161. Otherwise, the device is an IoT inactive wireless device 165.

Accordingly, through process 250, baseband-level capacity processor 200 may gain a much more substantive awareness of how many devices are occupying capacity on wireless network (using active connections), than would be possible if simply relying on the RRC and E-RAB KPIs. Further, connection measurement module 215 also takes into account devices that use network resources very infrequently and at low data volumes. This provides for a much more comprehensive awareness of the actual usage of network resources by a given baseband processor 112 at any given time.

One will recognize that the conditions tested in steps 258, 260, 262 are OR conditions (and further OR'ed with the AND combination of steps 264 and 266), and that the specific order of steps 258-262 may be rearranged without deviating from the function of process 250.

Also, although the RRC and E-RAB states are existing 3GPP KPIs corresponding to each wireless device and that this information is readily available as implemented the standard, this is not the case for all of the specific information required in each of steps 258, 260, 262, 264, 266, 268, and 270. This information must be obtained by enhancing the protocol stack 210 to "instrument" the code so that this information may be made visible to an API 205 or a similar software-implemented mechanism to extract and buffer this information so that it is accessible to the executing software of connection measurement module 215.

Connection measurement module 215 may be further configured to determine the types of connections for each of its active wireless devices 161 and inactive wireless devices 165. Generally, there are wide ranging types of wireless communications devices with different capabilities and purposes. Common types include mobile phones, smart phones and tablets. Characteristics which vary widely include: speed and throughput, mobility or fixed operation, radio interface such as WiFi and LTE, etc. One example of device type differentiation is to use a device category (e.g., the LTE Device Category). Particularly with the advent and expected growth of the Internet of Things (IoT), the variances will be even more pronounced and new categories of devices are being introduced to address the wide ranging IoT use cases. Each of the various wireless communication device categories will impose a different usage load on the wireless communication system. By identifying the device category and anticipating the type of demands the device will impose on the wireless communication system, connection measurement module 215 may apply administrator-defined policy rules (stored in configuration and policy module 220 described below) to handle connection requests for various device categories, or combination of categories, that are accessing the network concurrently.

For example, the following table offers a simple illustration of LTE device categories and their supported peak data rates. (http://www.3gpp.org/keywords-acronyms/1612-ue-category)

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers, 64QAM) 75376 (2 layers, 64QAM) | 3654144 | 2 or 4 |
| Category 7 | 301504 | 149776 (4 layers, 64QAM) 75376 (2 layers, 64QAM) | 3654144 | 2 or 4 |
| Category 8 | 2998560 | 299856 | 35982720 | 8 |
| Category 9 | 452256 | 149776 (4 layers, 64QAM) 75376 (2 layers, 64QAM) | 5481216 | 2 or 4 |
| Category 10 | 452256 | 149776 (4 layers, 64QAM) 75376 (2 layers, 64QAM) | 5481216 | 2 or 4 |
| Category 11 | 603008 | 149776 (4 layers, 64QAM) 195816 (4 layers, 256QAM) 75376 (2 layers, 64QAM) 97896 (2 layers, 256QAM) | 7308288 | 2 or 4 |

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 12 | 603008 | 149776 (4 layers, 64QAM) 195816 (4 layers, 256QAM) 75376 (2 layers, 64QAM) 97896 (2 layers, 256QAM) | 7308288 | 2 or 4 |

NOTE 1:
In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

Uplink physical layer parameter values set by the field UE-Category (36.306 table 4.1-2):

| UE Category | Maximum number of UL-SCH transport block bits transmitted within a TTI | Maximum number of bits of an UL-SCH transport block transmitted within a TTI | Support for 64QAM in UL |
|---|---|---|---|
| Category 1 | 5160 | 5160 | No |
| Category 2 | 25456 | 25456 | No |
| Category 3 | 51024 | 51024 | No |
| Category 4 | 51024 | 51024 | No |
| Category 5 | 75376 | 75376 | Yes |
| Category 6 | 51024 | 51024 | No |
| Category 7 | 102048 | 51024 | No |
| Category 8 | 1497760 | 149776 | Yes |
| Category 9 | 51024 | 51024 | No |
| Category 10 | 102048 | 51024 | No |
| Category 11 | 51024 | 51024 | No |
| Category 12 | 102048 | 51024 | No |

In addition to the above device categories, ACCS 100 may also accommodate LTE Narrow Band (NB) and Cat-M IoT devices.

Connection measurement module 215 may store data corresponding to each active wireless device 161 and inactive wireless device 165 as follows. For each active wireless device 161, it may store a device identifier, device category (Cat 0-12, Cat-M, or NB), and the state of each bearer of the device (e.g., "bursty" or "continuous").

Another function of connection measurement module 215 is to report status to client-level capacity processor 130 via API 205. It may do so periodically (e.g., once per measurement period) and/or in response to a request from client-level capacity processor 130 via API 205. Reporting may include the following information as of most recent measurement: the number of active wireless devices 161 and the device category of each, and the number of inactive wireless devices 165 and the device category of each, the number of connection requests from in-range wireless devices 160 that were granted by baseband-level capacity processor 200, and the number of connection requests from in-range wireless devices 160 that were denied by baseband-level capacity processor 200. The latter two figures may be the number since the previous reporting instance.

At each iteration of process 250, connection measurement module 215 may track instances in which a given device that was previously identified as an active wireless device 161 now has an inactive connection and is thus now an inactive wireless device 165, and vice versa. In the case of identifying a transition from active to inactive, connection measurement module 215 may increment the number of connection tokens in the baseband-level active connection allocation stored in configuration and policy module 220, indicating that an active connection has become available. Conversely, if a given device and transitioned from inactive to active (i.e., transitioned from being an inactive wireless device 165 to an active wireless device 161), connection measurement module 215 may decrement the number of connection tokens in the baseband-level active connection allocation. By doing this, the number of connection tokens in the baseband-level active connection allocation is regularly refreshed and updated.

Configuration and policy module 220 comprises a machine-readable memory that stores data pertaining to baseband-level capacity processor's 200 current allocation of connection tokens (i.e., its baseband-level active connection allocation), a flag indicating whether baseband-level capacity processor 200 is authorized to exceed its current allocation of connection tokens (i.e., "hard limit" vs. "soft limit"), and a value corresponding to the number of connections by which baseband-level capacity processor 200 may exceed its allocation in case of a soft limit (referred to herein as its overflow limit). In an example, configuration and policy module 220 may be implemented as a shared memory that can be accessed by connection measurement module 210, connection control module 225, and API 205 for read and write access.

Connection control module 225 performs the following functions: it receives requests for connections from various in-range wireless devices 160 seeking a connection to wireless base station 110; it retrieves the current number of active wireless devices 161 from connection measurement module 220; it retrieves the number of available connection tokens (i.e., its baseband level active connection allocation) from configuration and policy module 220; it compares the number of current connection requests, with the current number of available connection tokens; and it grants or denies connection requests based on the result of the comparison. If the number of requests exceeds the number of available connection tokens, then connection control module 225 may poll configuration and policy module 220 to determine whether connection control module 225 is authorized to exceed its allocation of available connection tokens (hard or soft limit), and the overflow limit (in case of a soft limit), and grants or denies the requests accordingly. Further, connection control module 225 may discriminate in granting or denying connections based on the device category determined by connection measurement module 215.

Connection control module 225 may periodically, or on request, report the following information to client-level capacity processor 130 via API 205: the number of active wireless devices 161 and the device category of each; the number of inactive wireless devices 165 and the device category of each; the number of connection requests from in-range wireless devices 160 that were granted and their device categories; and the number of connection requests from in-range wireless devices 160 that were denied, and their device categories. The reporting may be numbers integrated since the previous report.

Baseband processor look-ahead module 230 performs the following functions: it stores results of each recent iteration of process 250 executed by connection measurement module 215, along with a time stamp, to build a history of active connections and inactive connections of wireless devices to baseband processor 112; it implements a machine learning algorithm to identify patterns of high and low demand; and extrapolates recent usage patterns (using the stored history data) to calculate near-term demand for connections, and particularly whether the current active connection allocation stored in configuration and policy module 230 is sufficient to meet the extrapolated demand. It may do this in a sliding time window fashion. It will be understood that, for all instances of machine learning implementation disclosed herein, various algorithms may be employed and that one skilled in the art could identify the type of algorithm that would be needed and how to implement it in the context of the disclosure.

Baseband processor look-ahead module 230 may comprise a sector of memory, originating from a non-volatile machine-readable memory, that is encoded with instructions to perform the functions listed above. In particular, it may include instructions for executing a machine learning algorithm, and a sector of volatile and/or non-volatile memory for buffering/storing historical data of previous iterations of process 250 executed by connection measurement module 215.

FIG. 3A illustrates an exemplary baseband Initialization process 300 that would be executed by each baseband-level capacity processor 200 and client-level capacity processor 130 on system start. In step 302, the processor(s) executing baseband processor 112 power up, and spawn and initialize each of the baseband processor 112 modules 200, 210, 215, 220, and 225, illustrated in FIG. 2A. In step 304, configuration and policy module 220 executes instructions to request its allocation from client-level capacity processor 130, at which point client-level capacity processor 130 executes instructions to retrieve configuration data transmitted to it by server-level capacity processor 140, which may include a pre-determined baseband-level active connection allocation for the given baseband-level capacity processor 200.

In step 306, client-level capacity processor 130 may perform its own client look-ahead function to determine if the baseband-level active connection allocation designated for baseband-level capacity processor 200 is sufficient. If not sufficient, client-level capacity processor 130 may execute instructions to supplement the designated baseband-level active connection allocation from its own connection reservation 132. Further, in step 308, client-level capacity processor 130 may further execute instructions to request additional allocation from server-level capacity processor 140, and server-level capacity processor 140 may respond to the request in step 310. In another variation, depending on the sequence of the startup process for the entire ACCS, client-level capacity processor 130 may not have been pre-configured by server-level capacity processor 140 with the designated baseband-level active connection allocations for baseband-level capacity processors 200. In this case, when configuration and policy module 230 wakes up and requests its baseband-level active connection allocation from client-level capacity processor 130 in step 304, client-level capacity processor 130 may not have a designated baseband-level active connection allocation for it stored in its memory, in which case client-level capacity processor 130 may have to relay the allocation request to server-level capacity processor 140. Either way, server-level capacity processor responds to the request in step 310.

In step 312, client-level capacity processor 130 transmits the allocation of connection tokens (baseband-level active connection allocation) to the configuration and policy module 220 in baseband-level capacity processor 200. This may also include configuration and policy settings, such as whether the allocation limit is a hard limit or a soft limit, and if it's a soft limit, the value of the overflow limit.

FIG. 3B illustrates an exemplary process 320 by which connection control module 225 may respond to a UE connection request. In step 322, connection control module 225 receives a connection request from a UE. This may be done according to the LTE standard or via other communication technologies. In step 324, connection control module 225 invokes connection measurement module 215 to execute process 250, to determine the number of active connections, inactive connections, and their respective device categories. In step 326, connection control module 225 may then retrieve the data products of process 250 (e.g., the number of active wireless device 161 and inactive wireless devices 165, as well as their respective device categories), and retrieve the number of connection tokens corresponding to the allocation stored in configuration and policy module 220. Running process 250 in response to a UE request has the effect of updating (or refreshing) the current state of device connections and updating the current count of connection tokens in the allocation stored in configuration and policy module 220. With this done, the number of available connection tokens accurately reflects the current capacity usage of baseband processor 112, and how many more connections may be made before exceeding its limit.

Given this information, in step 328, connection control module 225 executes instructions to determine whether granting the connection request will exceed the limit determined by the current number of connection tokens (or baseband-level active connection allocation). This may be a simple as determining if there is at least one remaining connection token in the allocation, or it may involve determining the device category of the requesting device and comparing this to a look-up table stored in configuration and policy module 220 that lists connection priority by device category. If there is an available connection token in the allocation, connection control module 225 may proceed via the "no" branch of step 328 to step 330 in which connection control module 225 grants the connection request, and in step 332, decrements the number of connection tokens in the allocation.

If, however, there are no more connection tokens in the baseband-level active connection allocation, connection control module 225 may then proceed to step 334 to query configuration and policy module 220 to determine if this is a hard limit or a soft limit. If the former, then connection control module 225 may not exceed the current limit and proceeds to step 338 in which it denies the connection request. Alternatively, if the limit is a soft limit, then connection control module 225 is pre-authorized to exceed its baseband-level active connection allocation and proceeds to step 336, in which it determines if granting the current UE connection request would result in connection control module 225 exceeding its overflow limit. If so, then connection control module 225 proceeds to step 338 in which it denies the connection request. Otherwise, if granting the connection request will not exceed the overflow limit, then connection control module 225 proceeds to step 330 and 332 as described above.

In step 339, connection control module 225 executes instructions to update its status and may transmit its status to client-level capacity processor 130 in the form of a transaction report. Alternatively, connection control module 225 may store the transaction record for each iteration of process 320 and report the statistics of the accumulated iterations to client-level capacity processor 130 in a periodic manner.

Figure 3C:
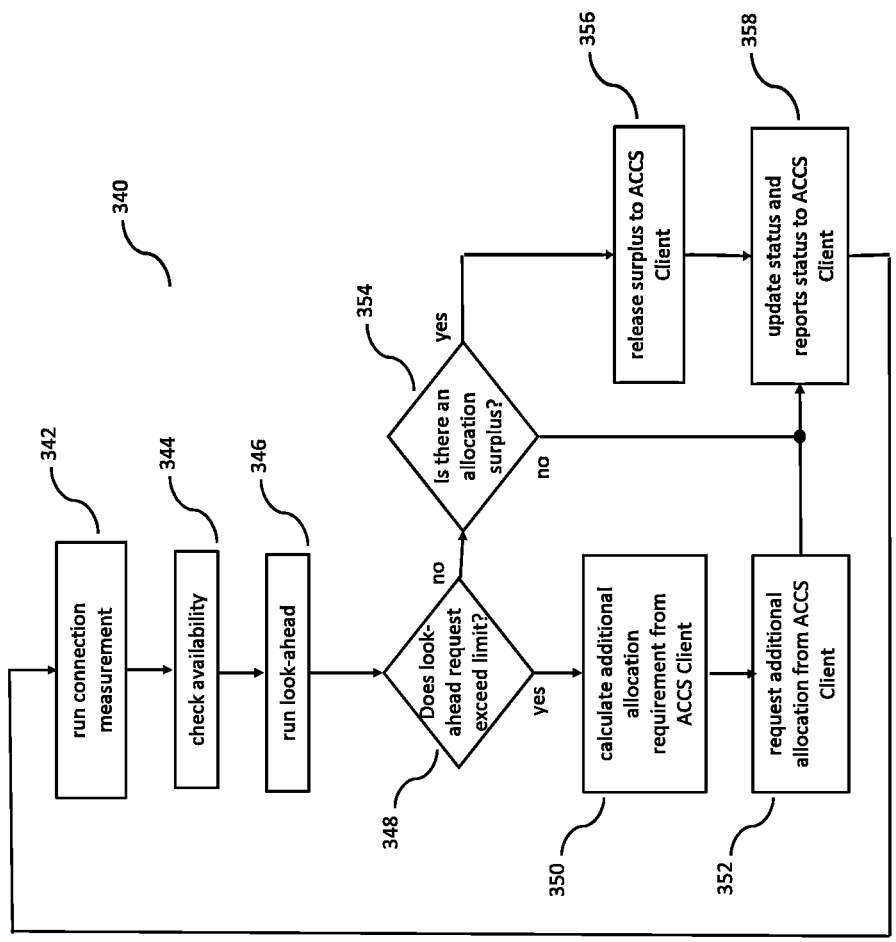
FIG. 3C illustrates an exemplary periodic update process, as executed by a connection control module.

FIG. 3C illustrates a periodic update process 340 executed by connection control module 225. This process is not done in response to a UE request and may be performed at a predefined interval, for example, every 15 minutes. Additionally, or alternatively, connection control module 225 may execute process 340 in response to a command from client-level capacity processor 130.

In step 342, connection control module 225 invokes connection measurement module 215 to execute process 250, and in step 344 it invokes the same module to check availability. Steps 342 and 344 may be the done in the same manner as steps 324 and 326 of process 320, which is done in response to UE connection request.

In step 346, baseband processor look-ahead module 230 executes instructions to estimate near-term upcoming demand for connections, as described above. In particular, look-ahead module 230 provides an estimate of the probability that connection demand will exceed the baseband-level active connection allocation between the time of execution of process 340 and the next, subsequent iteration of process 340.

In step 348, connection control module 225 executes instructions to retrieve the results of steps 342-346 and compare the estimated demand for connections to the baseband-level active connection allocation stored in configuration and policy module 220. If the demand is estimated to exceed the allocation, process 340 proceeds to step 350, in which connection control module 225 computes (from the results of steps 342-346) the number of additional connection tokens needed to meet anticipated demand, and requests for the additional allocation of connection tokens from client-level capacity processor 130 in step 352.

Alternatively, if the estimated demand does not exceed the baseband-level active connection allocation, then process 340 proceeds to step 354, in which connection control module 225 determines if the baseband-level active connection allocation has a surplus of connection tokens. Configuration and policy module 230 may store a parameter that is a connection token surplus threshold. This threshold is a number that, if the available connection tokens exceeds its value, then the connection tokens exceeding this number may be released to client-level capacity processor 130. If the number of available connection tokens exceeds the surplus threshold, then process 340 may proceed to step 356, in which connection control module 225 may release the surplus connection tokens via API 205 to client-level capacity processor 130. It may do so by decrementing its allocation and transmitting to client-level capacity processor 130 the number corresponding to its decremented allocation, thereby "transferring" the connection tokens up to the client-level capacity processor 130.

Further to step 354, if the estimated number of connection tokens does not exceed the surplus threshold, then process 340 proceeds to step 358.

Accordingly, connection control module 225 determines if the baseband processor is over-burdened (its baseband-level active connection allocation is insufficient and thus more connection tokens are needed), or under-burdened (its baseband-level active connection allocation has a surplus of connection tokens).

In step 358, connection control module 225 updates its statistics and estimates, stores it in its local memory, and transmits the updates in the form of a report to client-level capacity processor 130.

In an exemplary embodiment, connection control module 225 executes process 340 once every 15 minutes. However, one skilled in the art will readily recognize that longer periods between iterations will likely encompass a larger sample set of statistics on UE connection requests, but may suffer from reduced fidelity of look-ahead estimation.

Client-Level Capacity Processor

Each Wireless Base Station 110 has a client-level capacity processor 130, which may be implemented in dedicated embedded hardware or may be instantiated in software executed on computing infrastructure within—or associated with—wireless base station 110. In either case, the software for client-level capacity processor 130 would be encoded as machine instructions in a non-volatile computer-readable medium, which may be embedded within wireless base station 110 or at a remote site within IP network 145. Client-level capacity processor 130 has, or has allocated to it, a section of memory on which its active connection reservation 132 is stored. Client-level capacity processor 130 communicates with server-level capacity processor 140 over connection 133, which may be integrated within backhaul bus 134 or may be a separate dedicated connection.

Client-level capacity processor 130 performs the following functions: it interacts with each baseband-level capacity processor 200, via API 205, to obtain and derive information about current connections; it maintains history data regarding past connections, including a time record of connection token allocations to each baseband-level capacity processor 200, data regarding times in which demand for connections exceeded the baseband-level active connection allocations of each baseband-level capacity processor 200, data regarding each time a baseband-level capacity processor 200 requested additional connection tokens, and data regarding each time a baseband-level capacity processor 200 released surplus connection tokens; it performs a look-ahead function to determine upcoming need across its baseband processors 112 based on current connections and history; it maintains an active connection reservation 132 of connection tokens; it makes requests to server-level capacity processor 140 for additional connection tokens as needed; it releases surplus connection tokens to server-level capacity processor 140; and it reports current and historical data to server-level capacity processor 140.

As illustrated in FIGS. 1 and 2, client-level capacity processor 130 maintains an active connection reservation 132. Active connection reservation 132 may comprise a section of memory allocated to client-level capacity processor 130, in which it maintains a reserve of connection tokens. Server-level capacity processor 140 provides the active connection reservation 132 with its connection tokens, either directly, or in response to a request from the client-level capacity processor 130. Client-level capacity processor 130 may also have dedicated memory for storing history data of its interactions with, and reporting from, its baseband-level capacity processors 200 via API 205, with which it performs its look-ahead function, and from which it reports to server-level capacity processor 140.

Figure 3D:
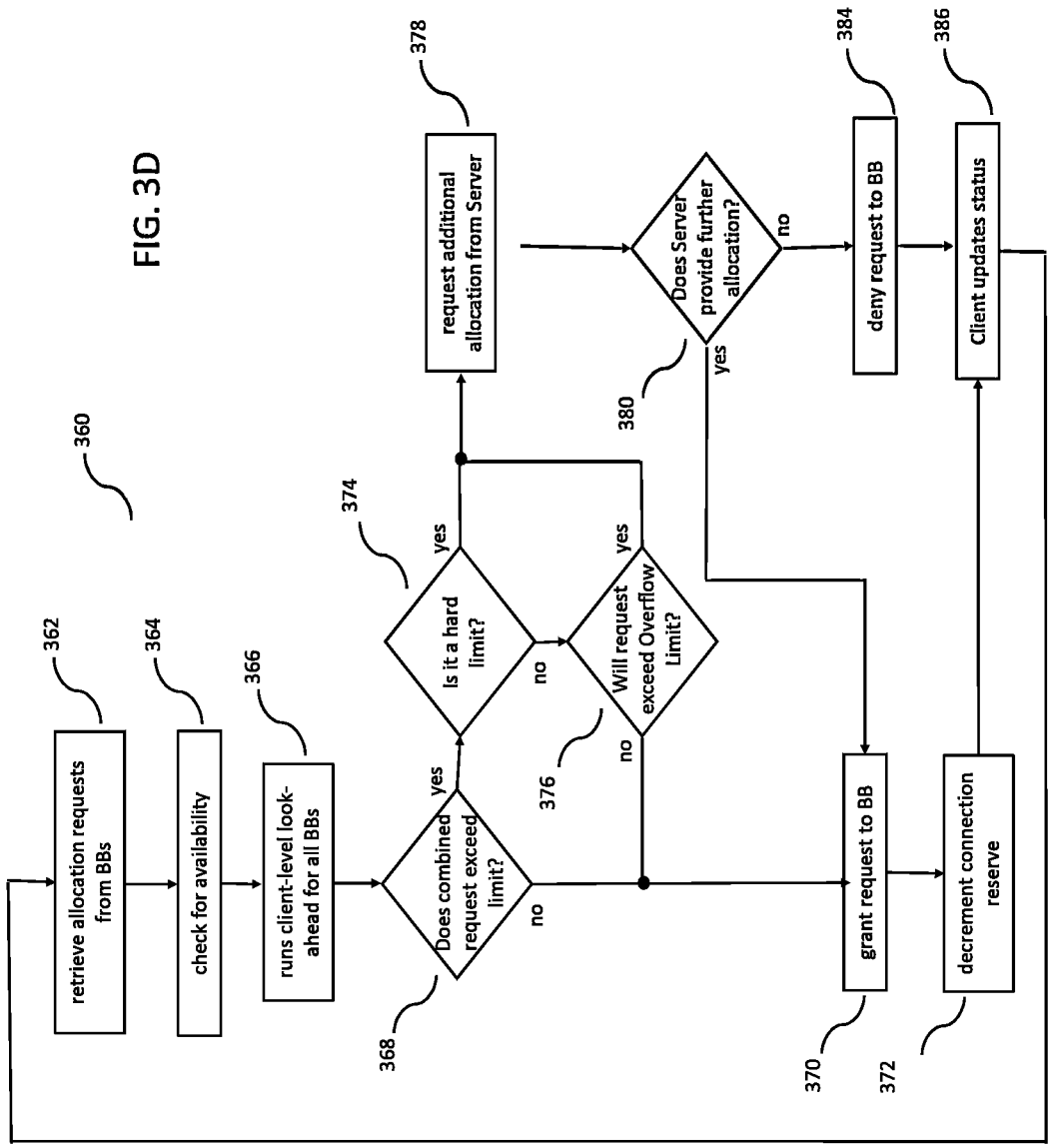
FIG. 3D illustrates an exemplary process executed by a client-level capacity processor, by which it responds to a request from a baseband-level capacity processor.

FIG. 3D illustrates an exemplary process 360 by which client-level capacity processor 130 responds to requests from each baseband-level capacity processor 200 to dynamically provide wireless capacity (in the form of connection tokens) for connections to the in-range wireless devices 160 in the vicinity of wireless base station 110. Process 360 may be executed in a loop, or at a prescribed interval (e.g., every 15 minutes), or in response to certain events such as prompting by server-level capacity processor 140 or an incoming allocation request from a baseband-level capacity processor 200. Client-level capacity processor 130 performs process 360 by executing machine readable instructions that are stored in non-volatile memory embedded within wireless base station 110 or at a remote site in IP network 145.

In step 362, client-level capacity processor 130 executes instructions to retrieve all of the requests for additional active connection allocations received from its baseband-level capacity processors 200 (as executed by each baseband-level capacity processor 200 in step 352 of process 340) since the last time client-level capacity processor 130 executed process 360. In step 364 client-level capacity processor aggregates the number of requested connection tokens from each baseband-level capacity processor 112 and compares it to its own allocation in its active connection reservation 132.

In step 366, client-level capacity processor 130 performs its own look-ahead function to extrapolate the demand for additional active connection allocation (in the form of connection tokens) from its baseband-level capacity processors 200 between the current time and the next time process 360 will be executed. In doing so, client-level capacity processor 130 may execute instructions implementing a machine learning algorithm that looks at the history of additional active connection allocation requests (and surplus connection token releases) from each of its baseband-level capacity processors 200. This may differ from the look-ahead function performed by the baseband-level capacity processors 200 in the following ways: 1) it aggregates the demand patterns across all of its baseband-level capacity processors 200 to assure that it can meet demand across all of them; 2) extrapolates the demand for additional allocation that is integrated across all of its baseband-level capacity processors 200 (in other words, some baseband-level capacity processors 200 may see a spike in demand when others may be releasing surplus connection tokens); 3) it identifies cross-correlation patterns between baseband-level capacity processors 200 and thus has a more global view of demand patters and may thus provide a more accurate extrapolation than at the baseband-level capacity processor 200 level; and 4) it can buffer released connection tokens in its connection reservation 132 in anticipation of extrapolated demand increases from other baseband-level capacity processors 200.

In step 368, client-level capacity processor 130 combines the currently available connection token allocation in its connection reservation 132 with the extrapolated demand computed in step 366 and determines whether the combined demand will exceed the limit imposed by its allocation in connection reservation 132. If not, client-level capacity processor 130 may proceed to step 370 in which it grants the allocation requests from each baseband-level capacity processor 200 and transmits, via API 205, corresponding connection tokens to each of the configuration and policy modules 220 in its baseband-level capacity processors 200.

If extrapolated demand does exceed the connection token allocation in active connection reservation 132, then client-level capacity processor 130 may proceed to step 374 in which it determines if this is a hard or a soft limit. This information may take the form of a parameter stored in client-level capacity processor 130 memory and would have been set by server-level capacity processor 140. If it is a soft limit, process 360 proceeds to step 376, in which client-level capacity processor 130 determines whether providing the requested connection tokens will exceed its overflow limit. If not, then the process proceeds to steps 370 and 372 as described above. If it does exceed the overflow limit, then process 360 proceeds to step 378 in which client-level capacity processor 130 requests additional connection tokens from server-level capacity processor 140.

In step 380, client-level capacity processor receives a response from server-level capacity processor, which may be a complete grant of the request issued in step 368, a partial grant, or a denial of the request. If the response is a complete or partial grant of the request, then client-level capacity processor 130 may proceed to step 370 as described above and allocate connection tokens to the appropriate baseband-level capacity processors 200. If the response is a denial, then client-level capacity processor 130 proceeds to step 384.

In step 386, client-level capacity processor 130 updates its status, including its own active connection reservation 132, and may report its status (along with the status reports of each of its baseband-level capacity processors 200) to server-level capacity processor 140.

NOTE: process 360 described above may be enhanced to factor in device category. In this case, each baseband-level capacity processor 200 may have requested a specific number of connection tokens for a specific set of device categories, and client-level capacity processor 130 may check availability and perform its look-head function on a device category by device category basis. Accordingly, connection tokens may be requested and transmitted in the form of a vector, with each basis being a device category.

Client-level capacity processor 130 interacts with server-level capacity processor 140 in the following ways: it issues requests to server-level capacity processor 140 for additional active connection token allocations; it receives connection tokens from server-level capacity processor 140, either in response to a request or directly from server-level capacity processor 140 based on analysis it has performed; it releases surplus connection tokens from active connection reservation 132; and it reports status and history (e.g., current status as well as history since last report) to the server-level capacity processor 140.

Server-Level Capacity Processor

Referring to FIG. 1, server-level capacity processor 140 (also referred to as ACCS Server) is connected to a plurality of client-level capacity processors 130 and has an active connection access pool 142 for storing its allocation of connection tokens. Server-level capacity processor 140 may be instantiated in IP network 145 as a cloud application, or it may be deployed within the wireless provider terrestrial network 147, where it may run on dedicated hardware and be stored in executable instructions encoded in non-volatile memory. Active connection access pool 142 may be a sector of memory allocated to server-level capacity processor 140, with which server-level capacity processor 140 stores connection tokens that it may allocate to each of its client-level capacity processors 130. Active connection access pool 142 may store the connection tokens as a simple count of active connections allocated to each client-level capacity processor 130, or it may be a logical representation of the allocated connection tokens. Active connection access pool 142 may be implemented in a similar fashion to active connection reservation 132, or may be implemented differently given its position in the system hierarchy of ACCS 100.

Server-level capacity processor 140 performs the following functions: it receives requests from each client-level capacity processor 130 for an additional allocation of connection tokens; it performs analytics to decide whether to deny, partially grant, or fully grant requests from each client-level capacity processor 130 and grants or denies accordingly; it receives reports from each client-level capacity processor 130 regarding the status reported in step 386 of process 360; it performs analytics on the historical data reported from each client-level capacity processor 130 to determine how to adaptively or proactively distribute connection tokens to its client-level capacity processors 130, and whether to request additional connection tokens from master-level capacity processor 150 (and how many to request); it requests additional connection tokens from master-level capacity processor 150; it determines whether it has a surplus of connection tokens, and if so, how many; and it releases connection tokens to master-level capacity processor 150 if it identifies a surplus.

Figure 4:
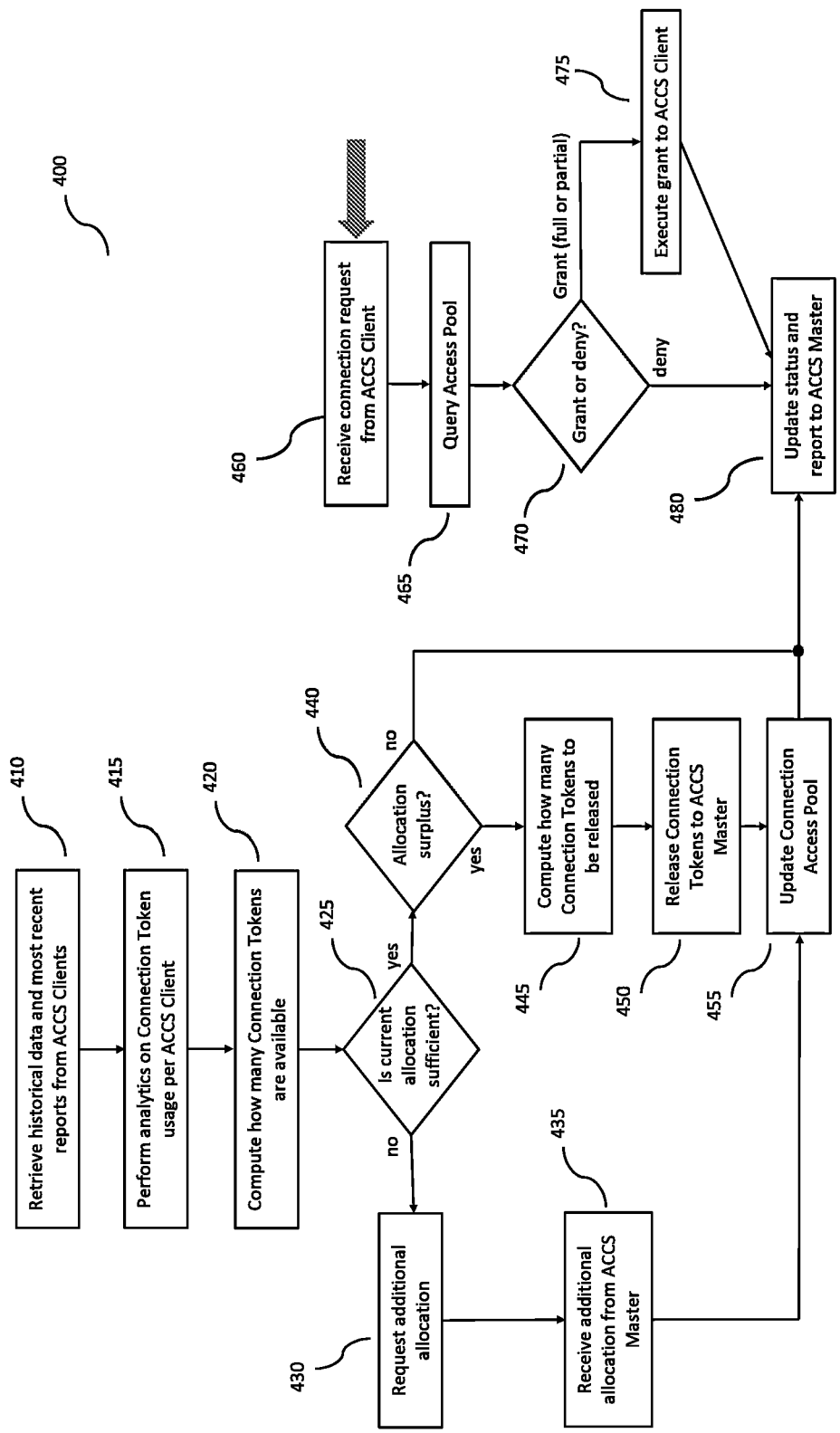
FIG. 4 illustrates an exemplary process executed by a server-level capacity processor, by which it interacts with client-level capacity processors and a master-level capacity processor.

FIG. 4 illustrates and exemplary process 400 by which server-level capacity processor 140 may adaptively allocate connection tokens to its client-level capacity processors 130 as well as interact with master-level capacity processor 150. It will be appreciated that variations in sequence of steps in process 400 are possible and within the scope of the disclosure.

In step 410, server-level capacity processor 140 executes instructions to retrieve historical data from its client-level capacity processors 130, which would include the most recent information reported in step 386 of process 360 by each. This may include server-level capacity processor 140 querying a shared memory between it and client-level capacity processors 130, or by other known methods for inter-task data communication.

In step 415, server-level capacity processor 140 executes instructions to perform analytics on the historical data to determine trends and anticipate near-future changes in usage of connection tokens. In doing so, server-level capacity processor 140 computes if the current number of connection tokens in connection access pool 142 is sufficient, and if an increase in demand is anticipated, including when and how many connection tokens will be needed, and of which device category or other form of device type. Analytics as described here may include executing a machine learning algorithm similar to the look-ahead algorithms implemented at the baseband processor level and the client-level capacity processor level. The difference here is that at the level of the server-level capacity processor 140, the look-ahead will include a broader data set comprising data from multiple client-level capacity processors 130 (and their respective baseband-level capacity processors 200) dispersed over a broader geographic area. Further, given the broader data set, it is likely that surges in demand for additional connection tokens, and instances of surplus connection token releases (from the client-level capacity processors 130) may somewhat integrate out over the broad distribution of client-level capacity processors 130. Accordingly, server-level capacity processor 140 may maintain its connection reserve pool 142 so that it is sufficiently deep to substantially even out these surges.

Server-level capacity processor 140 may, given its perspective in the wireless network in which ACCS 100 is deployed, be able to identify geographic and temporal demand patterns on a broader geographic scale, e.g., over the multiple city blocks and over the course of months. As such, unlike the look-ahead function performed by baseband-level capacity processor 200, which may be done over a shorter duration sliding window and at a tactical level, the look-ahead function performed by server-level capacity processor 140 may be done at the strategic level.

In steps 420 and 425, server-level capacity processor 145 queries its connection access pool 142 to determine, given the results of step 415, if it has sufficient connection tokens to provide for current and near-term foreseeable demand from its client-level capacity processors 130. This may include an assessment of device category. For example, connection reserve pool 142 may have a sufficient number of low-demand connection tokens (e.g., corresponding to device categories Cat 0 or Cat 1 vs. Cat 8) but not enough high demand connection tokens. If not, in step 430, server-level capacity processor 140 issues a request to master-level capacity processor 150 for additional connection tokens, which may include specific device categories.

In step 435, if master-level capacity processor 150 grants the request in step 430, fully or in part, server-level capacity processor 140 receives up to the requested number of connection tokens, at which stage server-level capacity processor 140 updates its connection access pool 142 accordingly in step 455.

Returning to step 425, if server-level capacity processor 140 determines that it has a sufficient number of connection tokens, as determined in step 420, then server-level capacity processor 140 determines if it has a surplus number of connection tokens in its active connection access pool 142. In doing so, server-level capacity processor 140 proceeds to step 440 and executes instructions to retrieve a configuration parameter corresponding to a surplus threshold value as dictated by policy set by master-level capacity processor 150. Server-level capacity processor 140 then compares this surplus threshold to the results of step 420. If the number of connection tokens determined in step 420 exceeds the surplus threshold, then server-level capacity processor 140 proceeds to step 445 where it computes the number of connection tokens to be released, and then in step 450, releases the surplus connection tokens to master-level capacity processor 150. With step 450 completed, server-level capacity processor 140 updates the number of connection tokens in its active connection access pool 142 in step 455. However, in step 440, if server-level capacity processor 140 determines that it does not have an excess number of connection tokens (i.e., a number exceeding the surplus threshold), then it proceeds to step 480.

In step 460, server-level capacity processor 140 receives a request from a client-level capacity processor 130 for additional active connection allocation, in the form of additional connection tokens. It will be apparent that step 460 is an independent event from the above-described steps of process 400 and may occur at any time during the process, and that server-level capacity processor 140 may respond to this request in an interrupt fashion (suspending its current state in process 400 to service the request), or it may continue is its execution of process 400 until it is ready to respond to the request. Either way, once server-level capacity processor 140 receives the request from a client-level capacity processor 130, it executes instructions in step 465 to query its active connection access pool 142 to determine if it has a sufficient number of connection tokens to grant the request.

In step 470, server-level capacity processor 140 decides whether to either deny the request, grant the request in full, or grant the request in part. Server-level capacity processor 140 compares the nature of the request (e.g., requested number of connection tokens and device category for each) to its active connection access pool 142 to see if there are sufficient connection tokens to service the request. The sub-process performed in step 470 may be substantially similar to steps 420-435 described above. If there are sufficient connection tokens to at least partially grant the request, then process 400 proceeds to step 475.

In step 480, server-level capacity processor 140 updates its status, including any revised status of its active connection reserve pool 142, store the updates in its memory, and report the new status to master-level capacity processor 150. In addition to reporting its own internally-generated information, server-level capacity processor 140 may also relay reports generated by each of its client-level capacity processors 130 and reported in step 386 of process 360.

Server-level capacity processor 140 may interact with master-level capacity processor 150 in the following ways: it receives data from master-level capacity processor 150 regarding configuration and policy, both for itself and for it to relay to client-level capacity processors 130; it makes request to master-level capacity processor 150 for additional connection tokens; it releases surplus connection tokens to master-level capacity processor 150; and it provides reports to master-level capacity processor 150, both its own internally-generated report as well as relaying reports from client-level capacity processors 130.

Variations to process 400 are possible and within the scope of the disclosure. For example, process 400 may be executed in a single loop solely in response to an allocation request from one or more client-level capacity processors 130. In this case, the process would operate similarly to process 360 executed by the client-level capacity processors 130. In this case, process 500 may include the analytics and other functions performed in steps 410-455 may be executed in place of step 465.

Master Level Capacity Processor

Referring again to FIG. 1, master-level capacity processor 150 (also referred to as ACCS Master) is coupled to a plurality of server-level capacity processors 140 and has a master active connection access pool 152. Master-level capacity processor 150 may be instantiated in IP network 145 as a cloud application, or it may be deployed within wireless provider terrestrial network 147 where it may run on dedicated hardware and be stored in executable instructions encoded in non-volatile memory. Master active connection access pool 152 may be a sector of memory allocated to master-level capacity processor 150, with which master-level capacity processor 150 stores connection tokens that amount to the total number of connection tokens obtained by the wireless provider and may include reserve connection tokens that have not been allocated to the server-level capacity processors 140. In other words, the master active connection access pool 152 represents the total number of connection tokens that are available to the wireless provider, and which the master-level capacity processor 150 may allocate adaptively to each of its wireless base stations 110 via the server-level capacity processors 140 and client-level capacity processors 130. It is from master access pool 152 that master-level capacity processor 150 draws connection tokens for allocating to each of its server-level capacity processors 140.

Master-level capacity processor 150 performs the following functions: it receives requests from each of its server-level capacity processors 140 for additional active connection allocation in the form of connection tokens; it performs analytics to decide whether to deny, partially grant, or fully grant requests from each server-level capacity processor 140 and grants or denies accordingly; it receives reports from each of its server-level capacity processors 140, reported in step 480 of process 400, which it uses in performing the analytics; it dynamically allocates connection tokens among its server-level capacity processors 140 based on the results of the analytics it performs; it generates reports on patterns of occurrences in which each client-level capacity processor 130 exceeded its allocation, including whether requests or connection tokens were partially or fully denied due to the client-level capacity processor 130 exceeding its overflow limit. Master-level capacity processor 150 may perform each of these functions as a function of device category.

Figure 5:
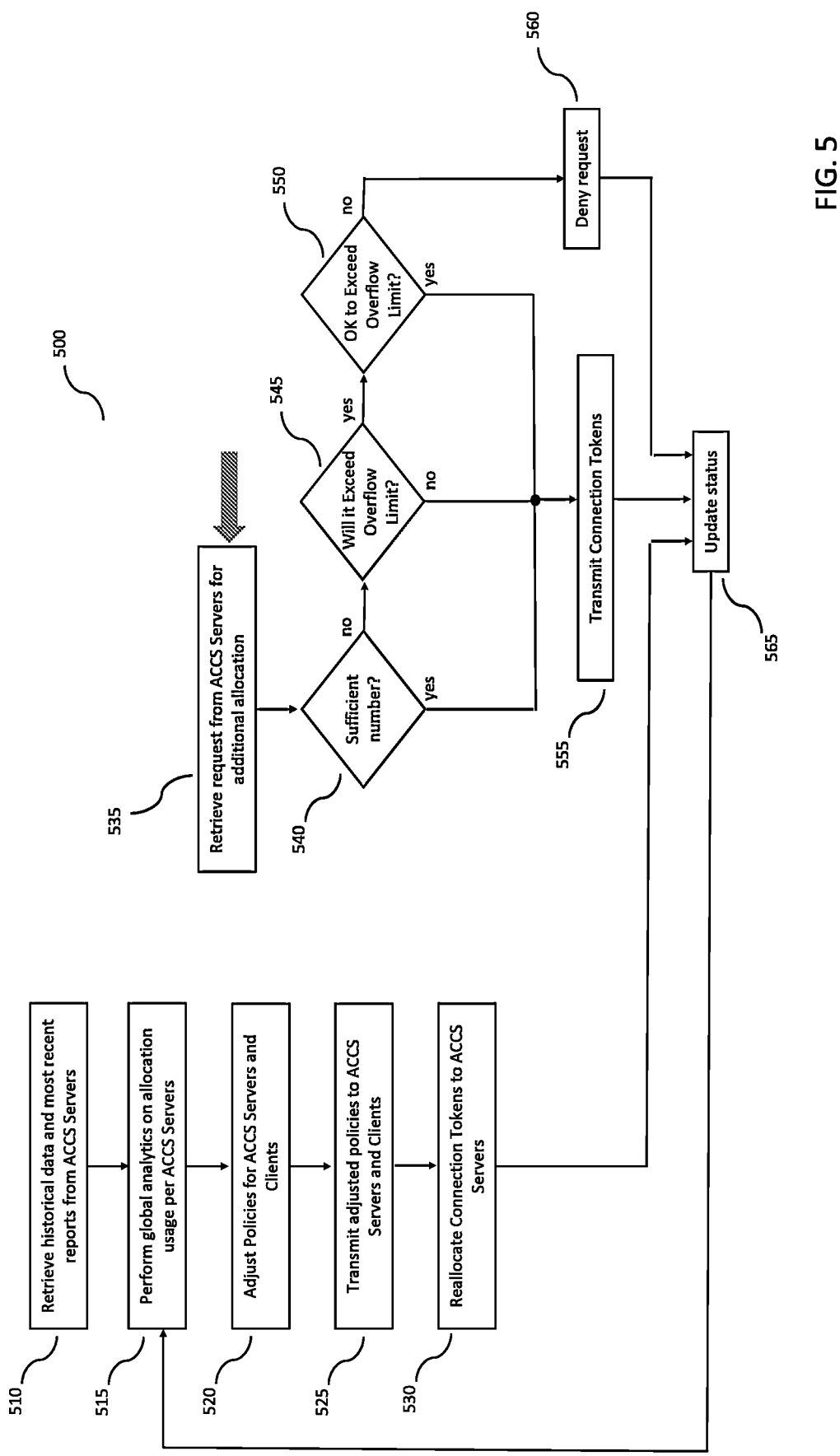
FIG. 5 illustrates an exemplary process executed by a master-level capacity processor, by which it adaptively allocates wireless capacity to its corresponding server-level capacity processors.

FIG. 5 illustrates an exemplary process 500 by which master-level capacity processor 150 may adaptively allocate connection tokens to each of its server-level capacity processors 140, as well as determine whether the current number of connection tokens in its master active connection access pool 152 is insufficient, sufficient, or too high.

In step 510, master-level capacity processor 150 executes instructions to retrieve reports provided by server-level capacity processors 140 in step 480 of process 400. These reports may be those that were received since the previous iteration of process 500. These reports may include reports generated by each server-level capacity processor's client-level capacity processors 130 in step 386 or process 360, or information that each server-level capacity processor 140 has synthesized from those lower reports. Alternatively, master-level capacity processor 150 may execute instructions to retrieve from its allocated memory select information from each of the reports that have already been received and stored in its memory.

In step 515, master-level capacity processor 150 executes instructions to perform analytics on the current, recent, and historical use of connection tokens by the wireless system in which the ACCS 100 is deployed. In doing so, master-level capacity processor 150 may maintain a table or buffer of data corresponding to the allocations made to each server-level capacity processor 140 and client-level capacity processor 130 to quantify the number of connection tokens (and potentially the device categories corresponding to each connection token) allocated to each at any given time, identify which of the client-level capacity processors exceeded their respective overflow limit during that time, and decide if more connection tokens are needed for the master access pool 152.

FIG. 6 illustrates a timeline demonstrating process 500 being executed over time. For the purposes of explaining step 515, the discussion will focus on the first time period 650. As stated above, in step 515, master-level capacity processor 150 executes instructions to sum the allocations to each server-level capacity processor 140 (to their respective active connection access pools 142) for each day within the time period, wherein each server-level capacity processor 140's allocation may be illustrated as a different shade in a given day's allocation 620. Accordingly, each day's allocation 620 may represent the partitioning of the master active connection access pool 152, representing how many connection tokens were allocated to each server-level capacity processor 140. Additionally, each shade band in each day's allocation 620 may also include the total requests made by each server-level capacity processor 140 above its allocation. The total number of connection tokens in the master active connection access pool 152 may be represented by limit line 630. Additionally, master-level capacity processor 150 may include not only report data from each server-level capacity processor 140, but may also include information regarding one or more client-level capacity processors 130, if those particular clients were experiencing an inordinate amount of demand at any given time.

One will appreciate that the use of four week time periods 650, and quantizing usage by daily allocations 620, are exemplary and that other time divisions and time periods are possible and within the scope of the disclosure.

Returning to FIG. 5, further to step 515, master-level capacity processor 150 may identify the instances in which the number of requested connection tokens exceeded the number in the master active connection access pool 152 (represented by limit line 630). Each instance is referred to herein as an overage 610. In this case, as illustrated, master-level capacity processor 150 may have executed instructions to exceed the overflow limit corresponding to the master active connection access pool 152 in response to overage 610. This information may include the device types and/or device categories corresponding to the overage 610.

In step 520, master-level capacity processor 150 executes instructions to adjust the policies of each server-level capacity processor 140 and optionally each client-level capacity processor 130. An example of this is to increase or decrease the overflow limit (or set the hard/soft limit parameter) corresponding to each, depending on overages 610 observed during the most recent time period 650, or across multiple such time periods. Another example of adjusting policy is to provide a preferential overflow limit depending on device category.

Further to step 520, master-level capacity processor 140 may execute instructions to determine whether its current master active connection access pool 152 is sufficient to meet the aggregate demand experienced in the most recent time period 650, or if it has excess capacity to meet the demand. In doing so, master-level capacity processor 150 may have an upper and lower configurable threshold of the number of overages 610 during a given time period. If the number of overages 610 exceeds the upper threshold, master-level capacity processor 150 may transmit a notification to the network operator customer indicating that additional connection tokens are needed. This may provide the network operator the option of purchasing additional connection tokens for its master active connection access pool 152. Alternatively, if the number of overages 610 is below the lower threshold, master-level capacity processor may transmit a notification to the network operator indicating that it has an excess of connection tokens and provide the option of buying back (or getting a rebate) on a certain number of connection tokens in its master active connection access pool 152. In doing so, master-level capacity processor 150 may execute instructions to calculate the number of connection tokens necessary to purchase or return to get the estimated number of overages 610 to be between the upper and lower thresholds. This process may include consideration of the device categories corresponding to the connection tokens, whether they are lacking or in excess.

In step 525, master-level capacity processor 150 executes instructions to transmit the revised policies to server-level capacity processors 140, which may include transmitting further policies directly to client-level capacity processors 130. Alternatively, the server-level capacity processors 140 may interpret or derive policies for each of its client-level capacity processors 130, based on its respective policy from master-level capacity processor 150.

In step 530, given the number of server-level capacity processors 140 that requested for additional connection tokens beyond their own allocations, as stored in their respective active connection reserve pools 142, master-level capacity processor 150 may reallocate connection tokens by repartitioning its master active connection access pool 152 from those server-level capacity processors 140 that appear have reserve connection tokens in their respective active connection access pools 142. This may be graphically depicted in FIG. 6 as a change in proportion of each shade band within the day's allocation 620. In doing so, master-level capacity processor 150 may execute instructions to simply redistribute connection tokens by increasing or decreasing (or by transmitting or retrieving) connection tokens to/from the active connection access pools 142 of each of its server-level capacity processors 140. Alternatively, master-level capacity processor 150 may further redistribute connection tokens at the client-level capacity processor 130 level by increasing or decreasing (or, again, by transmitting or retrieving) connection tokens to/from the active connection reservation 132 of each client-level capacity processor 130, or directly to the configuration and policy module 220 of each baseband processor 112 via API 205.

Steps 510-530 and 565 may be seen as a subprocess of process 500. These steps may be executed in a loop, at a regular interval, or in response to a signal from outside ACCS 100, e.g., from a user interface (not shown). Further, steps 535-560 may be seen as a separate subprocess, which may be executed at any time in response to a request from a server-level capacity processor 150. This subprocess is described below.

In step 535, master-level capacity processor 150 receives a request from one or more of its server-level capacity processors 140, according to step 430 of process 400. By issuing the request, server-level capacity processor 140 is asking or an increase in its allocation from the master active connection access pool 152. In response, in step 540, master-level capacity processor 150 executes instructions to determine whether there are enough connection tokens (and in corresponding device type or device category if applicable) by retrieving the relevant data from its master active connection access pool 152. If there are enough connection tokens in master active connection access pool 152, then master-level capacity processor 150 may proceed to step 555, in which it transmits the requested connection tokens to the requesting server-level capacity processor 140.

If there are not enough connection tokens in master active connection access pool 152, it may be because there are no connection tokens available, or there are connection tokens available but not enough to satisfy the requested number. In the former case, master-level capacity processor 150 proceeds to step 545. In the latter case, master-level capacity processor 150 may partially grant the request and proceed to step 555 to transmit the connection tokens that are available, and additionally proceed to step 545 with respect to the remaining connection tokens requested beyond the capacity of the master active connection access pool 152.

In step 545, master-level capacity processor executes instructions to determine if the requested connection tokens (or remaining requested connection tokens) are greater than its configured overflow limit. If not, then master-level capacity processor 150 may proceed to step 555 in which it transmits the requested connection tokens to the requesting server-level capacity processor 150. Otherwise, if fulfilling the request will exceed the overflow limit, then master-level capacity processor 150 proceed to step 550.

In step 550, master-level capacity processor 150 may retrieve information regarding its configured policy to determine if it may proceed, issue the requested connection tokens, and log the overflow event in its memory for subsequent analytics processing in step 515. The configured policy may set a limit to the number of times the overflow limit may be exceeded in one time period 650. If master-level capacity processor 150 determines that it has permission to exceed its overflow limit, it then proceeds to step 555 and transmits the requested connection tokens. Otherwise, it proceeds to step 560, denies the request. In either case, master-level capacity processor 150 may log the event in its memory for subsequent processing of analytics in step 515.

Further, in the example illustrated, master-level capacity processor 150 sums the allocation for each day over a four week time period to identify days in which the requests from server-level capacity processors 140, may have exceeded the total overflow limit of the master active connection access pool 152.

One will understand that variations to the above disclosure are possible and within the scope of the invention. For example, baseband processors 112, instead of being deployed in hardware on board wireless base station 110, may be implemented as virtual baseband processor that may be instantiated in IP network 145. In this case, baseband-level capacity processor 200 (and its components connection measurement module 220, configuration and policy module 220, connection control module 225), and API 205 may also be implemented as virtualized software components that are instantiated and executed in conjunction with virtual baseband processor 112. The same may be true for client-level capacity processor 130, in which case its connection reservation 132 may be stored in dedicated memory in IP network 145.

Also, it will be understood that variations to the partitioning of software modules described above are possible and within the scope of the disclosure.

Further, process 500 may be executed in a single loop whereby the master-level capacity processor 150 begins process 500 at step 535, in which it retrieves requests from its server-level capacity processors 140. Alternatively, the starting step of a single loop implementation of process 500 may be step 150, in which case step 535 would be executed after completion of step 530. In an additional possible variation, in step 535, master-level capacity processor 150 may receive requests in real-time from each server-level capacity processor 140. In this interrupt-driven approach, process 500 may be divided into two sub-processes: steps 510-530 and 565 as a background task, and steps 535-565 as an interrupt-driven task.

In addition to the above variation, ACCS System 100 may include additional layers of server-level capacity processors 140. In this case, ACCS System 100 may be a multi-tiered implementation whereby the structures and functions described above will involve additional layers of configuring policies, requesting connection tokens, and reporting, and other functions.

As a further variation, ACCS System 100 may be architected and deployed to support multiple network operators. In one example of this, master-level capacity processor 150 may have more than one master active connection access pool 152, one pool per network operator. Similarly, each server-level capacity processor 140 may have a plurality of active connection reserve pools 142; and each client-level capacity processor 130 may have a plurality of active connection reservations 132. In this case, each of the master-level capacity processor 150, server-level capacity processors 140, and client-level capacity processors 130 may have separate policy configurations as well as a master configuration for setting priorities and resolving conflicts or collisions among network operators in periods of high demand. Alternatively, multiple network operators may share the above cited pools, whereby the connection tokens are divided proportionally to the service level ascribed to each respective network operator.

What is claimed is:

1. A method for allocating connection capacity in a wireless communication system, comprising:
   receiving a request for an active connection;
   determining a number of available active connections;
   granting the request based on the number of available active connections being equal to greater than one, and decrementing the number of available active connections to calculate a decremented number of available active connections;
   determining a number of actively-connected UEs;
   periodically storing information corresponding to the number of actively-connected UEs and a time stamp in a memory;
   performing a look-ahead function to extrapolate demand for active connections during a time period between a first time and a next time the look-ahead function is performed; and
   updating an allocation of active connections for the time period based on the extrapolated demand from the stored information.

2. The method of claim 1, further comprising:
   requesting an allocation of additional active connections based on the decremented number of available active connections being equal to or less than a threshold value;
   receiving a responsive allocation of additional active connections; and
   incrementing the number of available active connections by a value corresponding to the responsive allocation of additional active connections.

3. The method of claim 1, further comprising:
   determining a number of inactively-connected UEs; and
   storing second information corresponding to the number of inactively-connected UEs in the memory.

4. The method of claim 1, wherein the receiving a request comprises determining a device category of the UE.

5. The method of claim 4, wherein the determining a number of available connections comprises determining a number of available connections for devices corresponding to the device category.

6. The method of claim 1, wherein performing the look-ahead function to extrapolate demand for active connections during a time period between a first time and a next time the look-ahead function is performed comprises:
   executing instructions implementing a machine learning algorithm that looks at a history of active connection allocations.

7. A non-volatile machine-readable memory encoded with instructions which, when executed by one or more processors, causes the one or more processors to allocate connection capacity within a wireless communication system, the process comprising:

receiving a request for an active connection;

determining a number of available active connections;

granting the request based on the number of available active connections being equal to greater than one, and decrementing the number of available active connections to calculate a decremented number of available active connections;

determining a number of actively-connected UEs;

periodically storing information corresponding to the number of actively-connected UEs and a time stamp in a memory;

performing a look-ahead function to extrapolate demand for active connections during a time period between a first time and a next time the look-ahead function is performed; and updating an allocation of active connections for the time period based on demand from the stored information.

8. The non-volatile machine-readable memory of claim 7, wherein the process further comprises:

requesting an allocation of additional active connections based on the decremented number of available active connections being equal to or less than a threshold value;

receiving a responsive allocation of additional active connections; and incrementing the number of available active connections by a value corresponding to the responsive allocation of additional active connections.

9. The non-volatile machine-readable memory of claim 7, wherein the process further comprises:

determining a number of inactively-connected UEs; and storing second information corresponding to the number of inactively-connected UEs in the memory.

10. The non-volatile machine-readable memory of claim 7, wherein the receiving a request comprises determining a device category of the UE.

11. The non-volatile machine-readable memory of claim 10, wherein the determining a number of available connections comprises determining a number of available connections for devices corresponding to the device category.

12. The non-volatile machine-readable memory of claim 7, wherein performing the look-ahead function to extrapolate demand for active connections during a time period between a first time and a next time the look-ahead function is performed comprises:

executing instructions implementing a machine learning algorithm that looks at a history of active connection allocations.

* * * * *